(12) United States Patent
Okada et al.

(10) Patent No.: US 7,158,638 B2
(45) Date of Patent: Jan. 2, 2007

(54) ENCRYPTION CIRCUIT

(75) Inventors: Souichi Okada, Kawasaki (JP); Naoya Torii, Kawasaki (JP); Tomohiro Hayashi, Kawasaki (JP); Chikahiro Deguchi, Kawasaki (JP); Yumi Fujiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 10/034,321

(22) Filed: Jan. 3, 2002

(65) Prior Publication Data
US 2003/0108195 A1      Jun. 12, 2003

(30) Foreign Application Priority Data
Jun. 28, 2001    (JP)    ............................. 2001-195752

(51) Int. Cl.
*H04K 1/04*    (2006.01)
(52) U.S. Cl. ............................................. 380/37
(58) Field of Classification Search ................. 380/37
See application file for complete search history.

(56) References Cited

U.S. PATENT DOCUMENTS

| | | | | |
|---|---|---|---|---|
| 6,314,186 | B1 * | 11/2001 | Lee et al. | 380/28 |
| 6,751,319 | B1 * | 6/2004 | Luyster | 380/37 |
| 6,937,727 | B1 * | 8/2005 | Yup et al. | 380/37 |
| 2001/0024502 | A1 * | 9/2001 | Ohkuma et al. | 380/46 |

OTHER PUBLICATIONS

Henry Kuo, et al., "Architectural Optimization for a 1.82Gbits/see VLSI Implementation of the AES Rijndael Algorithm", Electrical Engineering Department, University of California, Los Angeles.

Máire McLoone, et al., "High Performance Single-Chip FPGA Rijndael Algorithm Implementations", DiSip™ Laboratories, School of Electrical and Electronic Engineering, The Queen's University of Belfast, Belfast BT9 5AH, Northern Ireland.

Viktor Fischer, et al., "Two Methods of Rijndael Implementation in Reconfigurable Hardware", Laboratoire Traitement du Signal et Instrumentation, Unite Mixte de Recherche CNRS 5516, Université Jean Monnet, Sainte-Etienne, France.

(Continued)

*Primary Examiner*—Nasser Moazzami
*Assistant Examiner*—Pramila Parthasarathy
(74) *Attorney, Agent, or Firm*—Staas & Halsey LLP

(57) ABSTRACT

An encryption circuit that reduces a scale of circuit and can achieve a certain level of high-speed processing in the implementation of the AES block cipher. A round processing unit comprises: a first Round Key Addition circuit that adds a round key value to input data; an intermediate register/Shift Row transformation circuit that temporarily stores the output of the first Round Key Addition circuit and executes Shift Row transformation; a Byte Sub transformation circuit into which the values of the intermediate register/Shift Row transformation circuit are inputted and which executes Byte Sub transformation; a second Round Key Addition circuit into which the values of the intermediate register/Shift Row transformation circuit are inputted and which adds round key values; a Mix Column transformation circuit that executes Mix Column transformation upon the outputs of the second Round Key Addition circuit; and a second selector that outputs to the second Round Key Addition circuit one of the outputs of a first selector, the intermediate register/Shift Row transformation circuit, the Byte Sub transformation circuit, and the Mix Column transformation circuit.

20 Claims, 13 Drawing Sheets

OTHER PUBLICATIONS

Joan Daemen, et al., "AES Proposal: Rijndael", The Rijndael Block Cipher. http://csrc.nist.gov/encryption/aes/rijindael/Rijindael.pdf.

M. McLoone et al., "High Performance Single-Chip FPGA Rijndael Algorithm Implementations", Cryptographic Hardware and Embedded Systems, 3rd International Workshop, Ches 2001, Paris, France, May 14-16, 2001, Proceedings, Lecture Notes in Computer Science, Berlin: Springer, DE, vol. 2162, May 14, 2001, pp. 65-76.

J. Daemen et al., "AES Proposal: Rijndael", AES Proposal, XX, SS, Sep. 3, 1999, pp. 1-45.

* cited by examiner

```
Key Length == 128bit or 192bit
KeyExpansion ( byte Key [ 4 * Nk] word W [ Nb * ( Nr + 1 ) ]
{
        for ( i = 0 ; i < Nk ; i++ )
                W [ i ] = ( Key [ 4 * i ] , Key [ 4 * i + 1 ] , Key [ 4 * i + 3 ] ) ;
        for ( i = Nk ; i < Nb * ( Nr + 1 ) ; i ++ )
        {
                temp = W [ i − 1 ] ;
                if ( i % Nk == 0 )
                        temp = Sub Byte ( Rot Byte ( temp ) ) ^ Rcon [ i / Nk ] ;
                W [ i ] = W [ i − Nk ] ^ temp ;
        }
}

Key Length == 256bit
KeyExpansion ( byte Key [ 4 * Nk] word W [ Nb * ( Nr + 1 ) ]
{
        for ( i = 0 ; i < Nk ; i++ )
                W [ i ] = ( Key [ 4 * i ] , Key [ 4 * i + 1 ] , Key [ 4 * i + 3 ] ) ;
        for ( i = Nk ; i < Nb * ( Nr + 1 ) ; i ++ )
        {
                temp = W [ i − 1 ] ;
                if ( i % Nk == 0 )
                        temp = Sub Byte ( Rot Byte ( temp ) ) ^ Rcon [ i / Nk ] ;
                else if ( i % Nk == 4 )
                        temp = Sub Byte ( temp ) ;
                W [ i ] = W [ i − Nk ] ^ temp ;
        }
}
```

Fig. 2

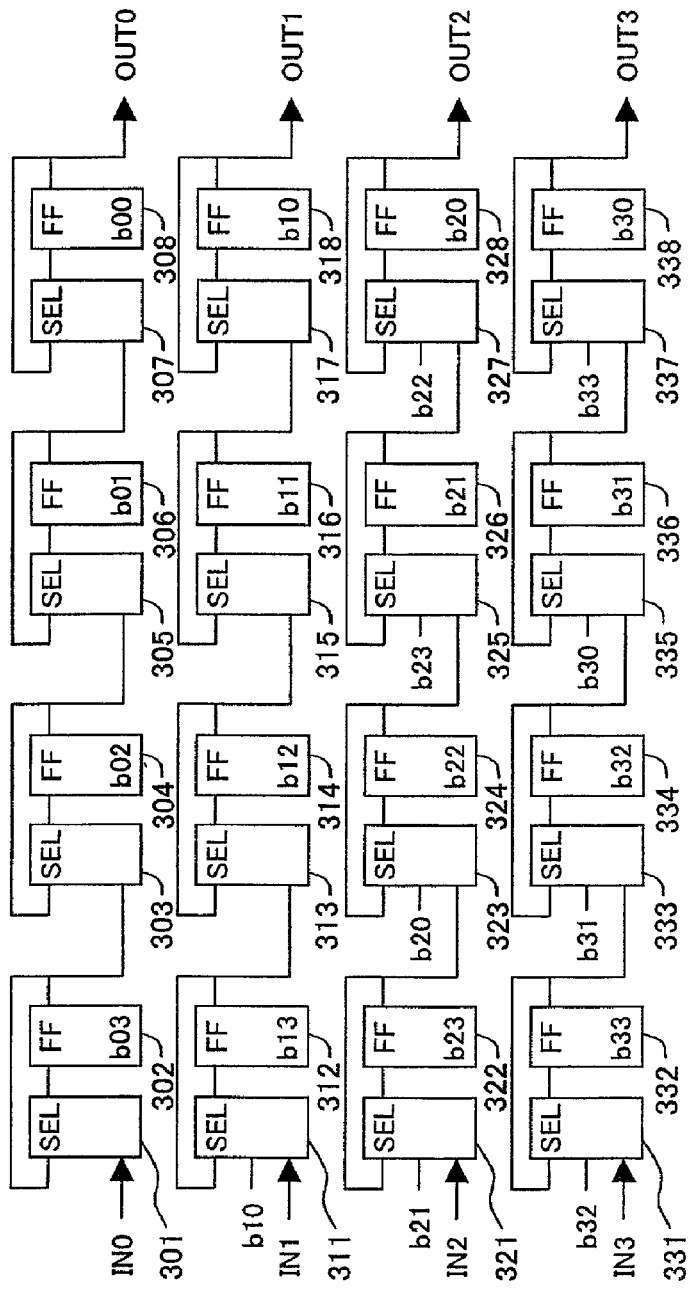
Fig. 5

ENCRYPTION CIRCUIT

BACKGROUND OF THE INVENTION

1. Technical Field

The present invention relates to an encryption circuit for implementing in hardware the Rijndael algorithm, which is the next generation common key block encryption standard, known as the AES (advanced encryption standard), and will replace the current common key block encryption standard in the US, called DES.

2. Description of Related Art

A great variety of services are being considered that involve the Internet, including electronic commerce and electronic money. These technologies are used not just in the daily lives of individuals, but also in a wide range of fields, including transactions among corporations and improving productivity. In particular, it is expected that encryption functions will be loaded onto smart cards and mobile handsets, for the purpose of verifying the identity of individuals, and that these technologies will be widely used for authentication, digital signatures, and data encryption.

Common key cryptography is used in these applications to prevent third parties from tapping on the Internet. The current standard adopted in the US for common key cryptography is DES; as its replacement, the AES (advanced encryption standard), known as the Rijndael algorithm, has been selected to be next generation common key block cryptography standard, and this algorithm is becoming the new standard. (The AES draft is available at http://csrc.nist-.gov/publications/drafts/dfips-AES.pdf)

AES is a block cipher for processing in block lengths of 128 bits, and the encryption algorithm, as shown in FIG. 1, is thought to be executable by an encryption circuit comprising a round function unit 20 and a key schedule unit 10. The round function unit 20 comprises an input register 21 that temporarily stores input data, an XOR processing unit 22 that XORs the input data and expanded key segment, a round processing unit 23, a final round processing unit 24 and an output register 25 that temporarily stores output data.

The round processing unit 23 comprises a Byte Sub transformation unit 31, a Shift Row transformation unit 32, a Mix Column transformation unit 33 and a Round Key Addition unit 34; the final round processing unit 24 performs the processing of the round processing unit 23 except for the Mix Column transformation 33; it comprises a Byte Sub transformation unit 35, a Shift Row transformation unit 36 and a Round Key Addition unit 37.

Round processing iterated; the number of rounds Nr including the final round depends on the key length inputted into the key schedule unit 10, and is defined as shown in Table 1.

TABLE 1

Key Length and Number of Rounds

| Key Length | Nr |
|---|---|
| 128 bit | 10 |
| 192 bit | 12 |
| 256 bit | 14 |

Thus for each key length round processing is executed Nr-1 times, and at the end the final round processing is executed. When the key length is 128 bits, round processing is executed 9 times; when 192 bits, 11 times; and when 256 bits, 13 times; and then in each case the final round processing is executed. Round keys generated at the key schedule unit 10 are inputted into the XOR processing unit 22, round processing unit 23 and final round processing unit 24.

The key schedule unit 10 generates round keys based on the key generation schedule specified in the AES draft; that algorithm is shown in FIG. 2.

The AES Proposal specification (AES Proposal: Rijndael, at http://csrc.nist.gov/encryption/aes/rijndael/Rijndael.pdf) introduces 2 hardware implementations for AES block cipher circuits.

One of these is a method for hardware implementation, in 128 bit units, of all the functions shown in FIG. 1 as they are (hereinafter, "conventional example 1"). In this case, for encryption and decryption, the order of processing of the functions is reversed, and thus it is necessary to prepare separate processing circuits for encryption and decryption.

Also, because, as shown in Table 1, it is necessary to change the number of times round processing is executed depending upon the key length, it is necessary to create circuits for each key length.

Furthermore, because of the reversal of order between encryption and decryption, the order of key generation in the key schedule unit 10 for the round keys used in the round function unit 20 has to be reversed between encryption and decryption. Therefore, either there has to be 2 separate key schedule units, for encryption and for decryption, or a method has to be devised for using the key schedule unit 10 for both encryption and decryption.

The second method, as shown in FIG. 3, involves creating a coprocessor 50 that has a Byte Sub transformation unit 51 and a Mix Column transformation unit 52, and implementing in hardware only the Byte Sub transformation and the Mix Column transformation functions, and having all other functions incorporated as software into a program 41, and then processing with a CPU 40 (hereinafter, "conventional example 2").

In this case, Byte Sub transformation and Mix Column transformation, which are unsuited for processing by the CPU 40 for reasons of processing time, are implemented in hardware as the coprocessor 50, and the other processing is processed by the program 41 stored in the CPU, thus allowing the circuit scale to be reduced.

If we suppose that the AES block cipher is to be incorporated into a smart card or the like, the functions required of an encryption circuit would be to maintain a certain level of processing speed, while keeping the scale of the circuit small. With these requirements, the conventionally proposed method of implementing all the functions in 128-bit units results in the scale of circuit being too large, making the loading thereof onto a smart card difficult. With the method of implementing in hardware only the Byte Sub transformation and the Mix Column transformation, and processing the other functions with software, there is the problem of the processing speed requirements not being fulfilled.

Moreover, with the key schedule unit 10 that generates the round keys, if all the round keys are stored in memory, a large-capacity memory is needed, and this would make the scale of circuit large. Therefore, in order to reduce the scale of circuit without reducing processing speed, it is desirable to generate round keys with a circuit constitution that does not require storing the entire expanded key in memory.

SUMMARY OF THE INVENTION

It is an object of the present invention to present an encryption circuit that is small in scale and that can achieve a certain level of processing speed when implementing the AES block cipher.

The present invention provides an encryption circuit that generates from a cipher key a plurality of round keys having a number of bits corresponding to a predetermined processing block length and executing, for each processing block length, input data and round key encryption/decryption processing, by means of a round function unit comprising an XOR operation unit that XORs the input data and one of the round keys and a round processing unit that iterates round processing that includes Byte Sub transformation, Shift Row transformation, Mix Column transformation and Round Key Addition, wherein:

the round processing unit comprises: a first selector that segments input data into execution block lengths smaller than the processing block length; a first Round Key Addition circuit that adds the round key value to input data for each the execution block length; an intermediate register/Shift Row transformation circuit that temporarily stores the output of the first Round Key Addition circuit and executes Shift Row transformation using the processing block length; a Byte Sub transformation circuit wherein the intermediate register/Shift Row transformation circuit value is inputted for each the execution block length and Byte Sub transformation is executed; a second Round Key Addition circuit wherein the intermediate register/Shift Row transformation circuit value is inputted for each the execution block length and the round key value is added for each the execution block length; a Mix Column transformation circuit executing Mix Column transformation on the output of the second Round Key Addition circuit; and a second selector that outputs to the first Round Key Addition circuit one output from among the outputs of the first selector, intermediate register/Shift Row transformation circuit, Byte Sub transformation circuit, or Mix Column transformation circuit.

Here, the execution block length can be a multiple of 8 bits, the processing block length can be 128 bits and the execution block length can be 32 bits.

Further, the key length of the cipher key can be any of 128 bits, 192 bits or 256 bits.

Also, the Byte Sub transformation circuit can comprise a matrix operation unit for decryption that executes a matrix operation on input data; a third selector that outputs either the input data or the output of the matrix operation unit for decryption; an inverse operation unit for executing an inverse operation on the data outputted from the third selector; a matrix operation unit for encryption that executes a matrix operation on the data outputted from the inverse operation unit; and a fourth selector that outputs either the output of the inverse operation unit or the output of the matrix operation unit for encryption.

Further, the matrix operation unit for decryption and the matrix operation unit for encryption comprises an XOR circuit so as to perform 8-bit operations at one clock cycle and the matrix operation unit for decryption and the matrix operation unit for encryption comprises an XOR circuit so as to perform 1-bit operations at one clock cycle.

Also, the intermediate register/Shift Row transformation circuit can be used for both encryption and decryption through the reversal of order of input of shift data relating to amount of shift for data to be inputted into the intermediate register/Shift Row transformation circuit, the input order for decryption being the reverse of the order for encryption.

Further, the Mix Column transformation circuit can comprise a plurality of multiplication units with unique multipliers and an XOR circuit that performs XOR operations for the plurality of multiplication units, the Mix Column transformation circuit executing a matrix operation between data inputted into each multiplication unit and the multiplier established for each multiplication unit. In this case, the Mix Column transformation circuit comprises 4 operation units having 4 multiplication units capable of 8-bit unit operations and XOR circuits that execute XOR operations based on the outputs of the 4 multiplication units. This multiplication units can control 2 multipliers and are used for both encryption and decryption and the multiplication units can be constituted to control addition values from high-order bits.

Also, an encryption circuit can be constituted so as to have a key expansion schedule circuit that generates from the cipher key, as an expanded key segmented into bit numbers corresponding to the execution block length, a plurality of round keys with bit numbers corresponding to a predetermined processing block length. The key expansion schedule circuit comprises: a fifth selector that segments a cipher key into the number of bits corresponding to the execution block length and outputs the same;

a shift register to which flip-flop circuits are connected at a plurality of stages, the flip-flop circuits latching data in units of the execution block length;

a first XOR circuit that XORs the output of the final stage flip-flop circuit of the shift register with one constant selected from among a group of constants;

a sixth selector into which are inputted the outputs of those flip-flops of the shift register that are involved in operations for encryption and the outputs of those flip-flops involved in operations for decryption, and which selectively outputs one of these;

a Rot Byte processing circuit that rotates the output of the sixth selector;

a seventh selector into which the output of the sixth selector and the output of the Rot Byte circuit is inputted and which selectively outputs one of these;

a Sub Byte processing circuit that executes Byte Sub transformation on the output of the seventh selector for each the execution block length;

an eighth selector into which the output of the sixth selector and the output of the Sub Byte processing circuit are inputted, and which selectively outputs one of these;

a second XOR circuit that executes an XOR operation based on the output of the first XOR circuit and the output of the eighth selector; and a shift register unit selector that selectively outputs, to those flip-flops of the shift register the outputs of which are subject to operations for encryption, either the output of the second XOR circuit or the output of the adjacent stage flip-flop.

Here, the shift register comprises 8 flip-flops executing data processing in 32-bit units, and the sixth selector is constituted so that the outputs of the second, fourth, sixth and eighth flip-flops from the bottom from among the flip-flops are inputted therein, and that it outputs one of these.

Also, through the input into the seventh selector of the output of the intermediate register/Shift Row transformation circuit and the input into the second selector of the output of the Sub Byte processing circuit, a single circuit can be used for the Sub Byte processing circuit and the Byte Sub transformation circuit of the round processing unit.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 2 is a key schedule program list;

FIG. 5 is a block diagram showing an intermediate register/Shift Row transformation circuit;

DETAILED DESCRIPTION OF THE PREFERRED EMBODIMENTS

Round Function Unit

Figure 1:
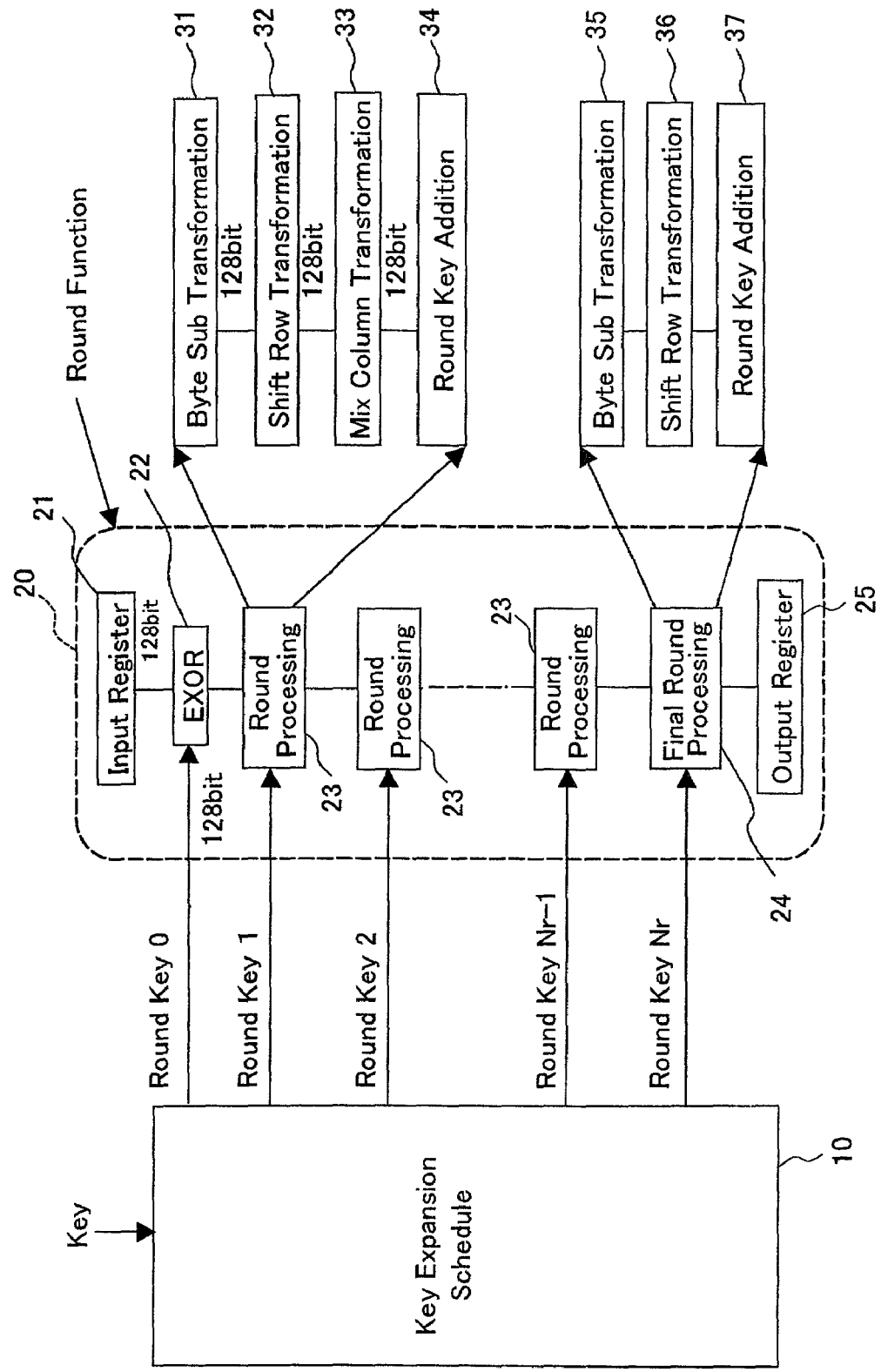
FIG. 1 is a block diagram of AES processing using the Rijndael algorithm.
Figure 3:
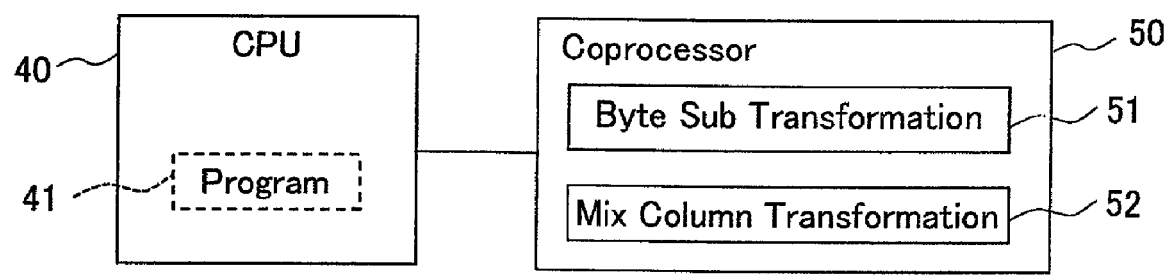
FIG. 3 is a block diagram showing one envisioned circuit implementation.

The AES block cipher is an algorithm that encrypts/decrypts the 128 bit data with the 128 bit, 192 bit or 256 bit key. As shown in FIG. 1, it comprises a key schedule unit 10 that generates a plurality of round keys from the cipher key, and a round function unit 20 that uses the round keys inputted from the key schedule unit 10 to encrypt and decrypt. The round function unit 20 performs such processing as XOR operations, Byte Sub transformation processing, Shift Row transformation processing, Mix Column transformation processing, Round Key Addition processing.

Figure 4:
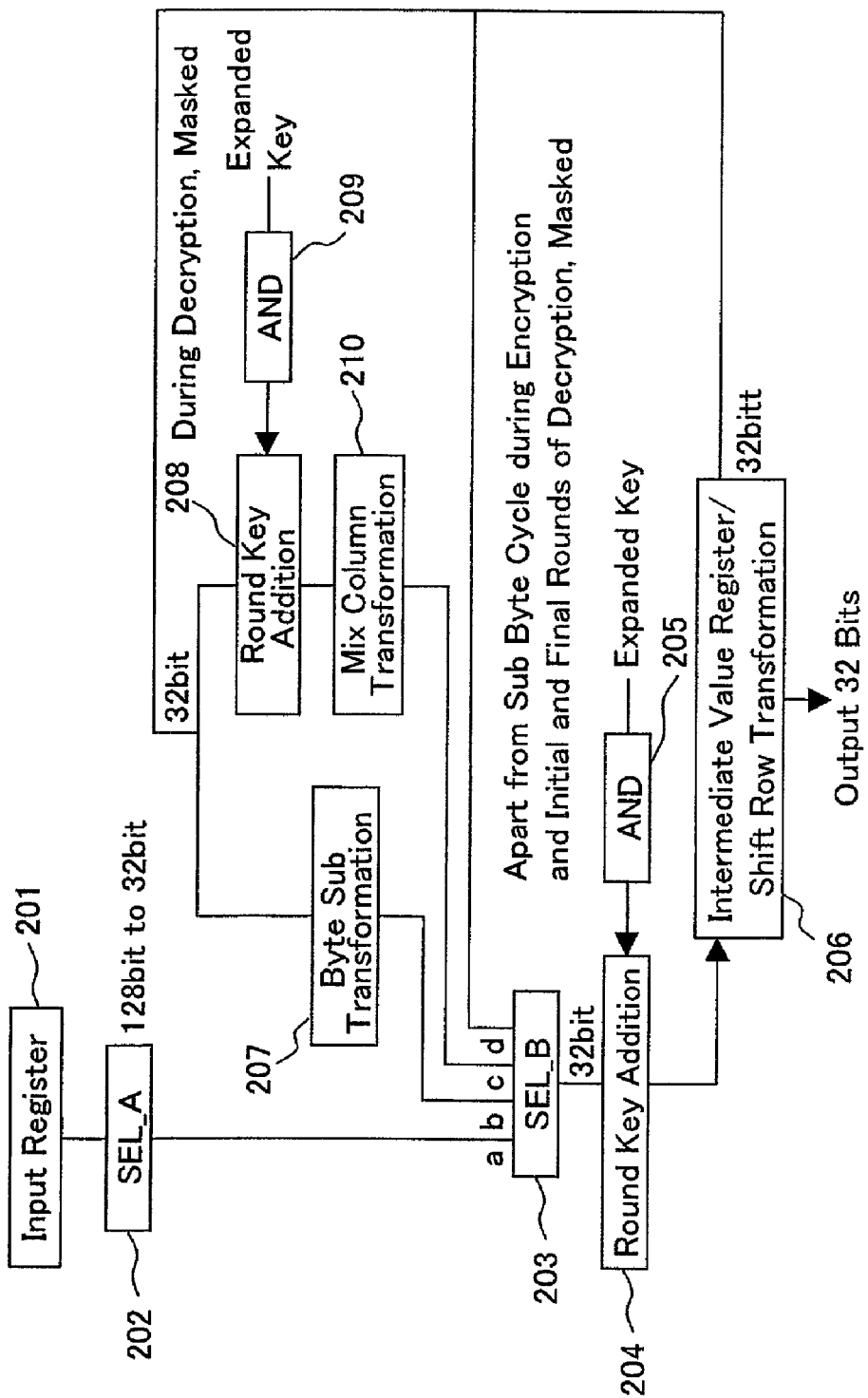
FIG. 4 is a block diagram of a round function unit adopted in a first embodiment of the present invention.

The first embodiment of the present invention is a circuit for implementation of this round function unit 20, and the constitution of this circuit is shown in FIG. 4. Each circuit block executes 32-bit processing with the exception of Shift Row transformation processing, which is 128-bit processing; transfer of data between circuit blocks is executed in 32-bit units.

This round function unit contains: an input register 201 that temporarily stores input data; a first selector 202 that selects 32-bit data from the 128-bit input data; a second selector 203 into one input terminal of which the output of the first selector 202 is inputted; a first Round Key Addition circuit 204 into which the output of the second selector 203 is inputted; an add data selector 205 that inputs into the first Round Key Addition circuit 204 an expanded key segment or "0"; an intermediate register/Shift Row transformation circuit 206 that stores the output value of the first Round Key Addition circuit 204 and executes Shift Row transformation in 128-bit units; a Byte Sub transformation circuit 207 into which intermediate register/Shift Row transformation circuit 206 values are inputted and which executes Byte Sub transformation; a second Round Key Addition circuit 208 into which intermediate register/shift Row transformation circuit 206 values are inputted for each 32 bits; an add data selector 209 which inputs into the second Round Key Addition circuit 208 an expanded key segment or "0"; and a Mix Column transformation circuit 210 which executes Mix Column transformation on the output of the second Round Key Addition circuit 208. The outputs of the first selector 202, Byte Sub transformation circuit 207, Mix Column transformation circuit 210, and intermediate register/Shift Row transformation circuit 206 are inputted into the second selector 203, and one of these outputs is outputted to the first Round Key Addition circuit 204.

Operation Schedule During Encryption

The operation schedule during encryption in the round function unit is shown in Table 2.

TABLE 2

Round Function Operation Schedule

| Round | Cycle | Processing | SEL_B |
|---|---|---|---|
| 0 | 000–003 | Round Key Addition | a |
| 1 | 004–007 | Byte Sub Transformation | b |
|   | 008 | Shift Row Transformation | c |
|   | 009–012 | Mix Column Transformation Round Key Addition | c |
| 2 | 013–016 | Byte Sub Transformation | b |
|   | 017 | Shift Row transformation | c |
|   | 018–021 | Mix Column Transformation Round Key Addition | c |
|   | Omitted | | |
| Nr–1 | #1 | Byte Sub Transformation | b |
|   | (Nr–1)*9–1 | Shift Row Transformation | c |
|   | (Nr–1)*9 – | Mix Column Transformation | c |
|   | (Nr–1)*9+3 | Round Key Addition | |
| Nr | #2 | Byte Sub Transformation | b |
|   | Nr*9–1 | Shift Row Transformation | d |
|   | Nr*9 – | Round Key Addition | d |
|   | Nr*9+3 | | |

1:(Nr–1)*9–5 – (Nr–1)*9–2
2:Nr*9–5 – Nr*9–2
Note:
The table shows operations during encryption. In decryption, the order of round key and Mix Column processings is switched.

Here, in round 0, addition of an expanded key segment is executed by the first Round Key Addition circuit 204 with a selector position of "a" for the second selector 203. Input data in the input register 201 is selected in 32 bit units by the first selector 202 and inputted into the first Round Key Addition circuit 204, and to this is added a portion of a round key, inputted from the key schedule unit, this portion being a 32-bit segment of the expanded key. While the input data and the expanded key are being changed into 32-bit units, the first Round Key Addition circuit 204 executes addition processing, and the XOR processing of the XOR unit 22 in FIG. 1 is thereby executed on 128-bit processing blocks in the 4 cycles of cycles 000 through 003. The result of the operation by the first Round Key Addition circuit 204 is stored in order in 32-bit units in the intermediate register/Shift Row transformation circuit 206.

In round 1, the round processing 23 in FIG. 1 is executed, and Byte Sub transformation processing 31, Shift Row transformation processing 32, Mix Column transformation processing 33, and Round Key Addition processing 34 are executed. Thus, first of all, in cycles 004 through 007, with a selector position of "b" for the second selector 203, the data stored in the intermediate register/Shift Row transformation circuit 206, while being shifted in 32-bit units, is read out and inputted into the Byte Sub transformation circuit 207. At this time, by making the data to be selected by the add data selector 205 "0", the first Round Key Addition circuit 204 is put into a masked state. The result of the operations of Byte Sub transformation circuit 207 is stored in order in 32-bit units in the intermediate register/Shift Row transformation circuit 206. Thus Byte Sub transformation processing performs on 128 bits, and the result is stored in the intermediate register/Shift Row transformation circuit 206.

Next, in cycle 008, Shift Row transformation processing is executed. The intermediate register/Shift Row transformation circuit 206 is capable of executing Shift Row transformation processing in 128-bit units, and in this cycle 008, 128-bit Shift Row transformation processing is executed. At this time, the selector position of the second selector 203 may be any position, but in consideration of the processing in the next cycle, a position of "c" is preferable.

In cycles 009 through 0012, Mix Column transformation processing and Round Key Addition processing are executed. Herein, the data stored in the intermediate register/Shift Row transformation circuit 206, while being shifted in 32-bit units, is read out and inputted into the second Round Key Addition circuit 208. At this time, by making the data to be selected by the add data selector 209 "0", the second Round Key Addition circuit 208 is put into a masked state. By setting the selector position of the second selector 203 at "c", the data upon which Mix Column transformation processing has been executed at the Mix Column transformation circuit 210 is inputted into the first Round Key Addition circuit 204 via the second selector 203. An expanded key segment to be inputted from the key schedule unit is selected for data to be selected by the add data selector 205, and this data undergoes Round Key Addition processing at the first Round Key Addition circuit 204. The result of the Mix Column transformation processing at the Mix Column transformation circuit 210 and the Round Key Addition processing at the first Round Key Addition circuit 204 are, while being each shifted in 32-bit units, stored in the intermediate register/Shift Row transformation circuit 206. Thus, the result of the 128 bits upon which Mix Column transformation processing and the Round Key Addition processing were executed in cycles 009 through 012 are stored in the intermediate register/Shift Row transformation circuit 206. In this manner, one round of processing is executed in the 9 cycles of cycles 004 through 012.

Next, in rounds 2 through (Nr-1), the same processing as in round 1 is executed (however, Nr is the number of processing rounds including the final round, and as shown in Table 1, the number of rounds will differ according to key length).

In round Nr (the final round), the final round processing 24 of FIG. 1 is executed; this comprises Byte Sub transformation processing 35, Shift Row transformation processing 36 and Round Key Addition processing 37.

Thus in cycles (Nr*9−5) through (Nr*9−2), with the selector position of the second selector 203 at "b", data stored in the intermediate register/Shift Row transformation circuit 206, while being shifted in 32-bit units, is read out and inputted into the Byte Sub transformation circuit 207. At this time, by making the data to be selected by the add data selector 205 "0", the first Round Key Addition circuit 204 is put into a masked state. The result of the operation of the Byte Sub transformation circuit 207 is stored in order in 32-bit units in the intermediate register/Shift Row transformation circuit 206. Thus Byte Sub transformation processing of 128 bits is performed, and the result is stored in the intermediate register/Shift Row transformation circuit 206.

Next, in the (Nr*9−1) cycle, 128-bit Shift Row processing is executed. At this time, the selection position of the second selector 203 may be any position, but in consideration of the processing of the next cycle, a position of "d" is preferable.

In the (Nr*9) through (Nr*9+3) cycles, Round Key Addition processing is executed. Specifically, by making the selector position of the second selector 203 "d", the data stored in the intermediate register/Shift Row transformation circuit 206, while being shifted in 32-bit units, is read out and inputted into the first Round Key Addition circuit 204 via the second selector 203. At this time, by making data to be selected by the add data selector 205 an expanded key segment to be inputted from the key schedule unit, the first Round Key Addition circuit 204 adds 32-bit round keys. The result of the Round Key Addition processing by the first Round Key Addition circuit 204 is stored in the intermediate register/Shift Row transformation circuit 206 while being shifted in 32-bit units. Thus in the (Nr*9) through (Nr*9+3) cycles, the result of the Round Key Addition processing on the 128 bits is stored in the intermediate register/Shift Row transformation circuit 206. In this manner, in the 9 cycles from (Nr*9−5) through (Nr*9+3), final round processing is executed.

Operation Schedule During Decryption

Operations during decryption in this round function unit are performed in the reverse order to operations during encryption. This operation schedule is shown in Table 3.

TABLE 3

Round Function Operation Schedule

| Round | Cycle | Processing | SEL_B |
|---|---|---|---|
| 0 | 000–003 | Round Key Addition | a |
| 1 | 004 | Shift Row Transformation | b |
|  | 005–008 | Byte Sub Transformation | b |
|  | 009–012 | Round Key Addition Mix Column Transformation | c |
| 2 | 013 | Shift Row Transformation | b |
|  | 014–017 | Byte Sub Transformation | b |
|  | 018–021 | Round Key Addition Mix Column Transformation | c |
|  | Omitted |  |  |
| Nr−1 | (Nr−1)*9−5 | Shift Row Transformation | b |
|  | #1 | Byte Sub Transformation | b |
|  | (Nr−1)*9 – (Nr−1)*9+3 | Round Key Addition Mix Column Transformation | c |
| Nr | Nr*9−5 | Shift Row Transformation | b |
|  | #2 | Byte Sub Transformation | b |
|  | Nr*9 – Nr*9+3 | Round Key Addition | d |

1:(Nr−1)*9−4 – (Nr−1)*9−1
2:Nr*9−4 – Nr*9−1

In round 0, with the selector position of the second selector 203 at "a", the first Round Key Addition circuit 204 adds expanded key segments. Input data in the input register 201 is selected in 32-bit units by the first selector 202 and inputted into the first Round Key Addition circuit 204, and from the round key to be inputted from the key schedule unit, a 32-bit expanded key segment is added. At this time, data to be inputted via the first selector 202 is inputted in an order that is the reverse of the input order for encryption, and the input order of the expanded key segments to be inputted from the key schedule input is also the reverse of the input order for encryption. In this manner, as the input data and expanded key are changed every 32 bits, the first Round Key Addition circuit 204 executes add processing, thereby allowing execution of Round Key Addition processing on a 128-bit processing block in cycles 000 through 003. The result of the operations of the first Round Key Addition circuit 204 is stored in 32-bit units in the intermediate register/Shift Row transformation circuit 206.

In round 1, processing is performed in the order of Shift Row transformation, Byte Sub transformation, Round Key Addition, and Mix Column transformation. For this reason, first, in cycle 004, in the intermediate register/Shift Row transformation circuit 206, Shift Row transformation processing is executed in 128-bit units. In this case the processing is the same as the Shift Row transformation processing during encryption. Also, the selector position of the second selector 203 may be any position, but in consideration of the processing in the next cycle, a position of "b" is preferable.

Next, in cycles 005 through 008, with a selector position of "b" for the second selector 203, data stored in the intermediate register/Shift Row transformation circuit 206, while being shifted in 32-bit units, is read out and inputted into the Byte Sub transformation circuit 207. At this time, by making the data to be selected by the add data selector 205 "0", the first Round Key Addition circuit 204 is put into a masked state. The result of the operation by the Byte Sub transformation circuit 207 is stored in order in the intermediate register/Shift Row transformation circuit 206 in 32-bit units. In this case, the Byte Sub transformation processing is executed so as to be the inverse of the transformation processing during encryption; this will be discussed below. In this manner, Byte Sub transformation processing is performed on 128 bits, and the result is stored in the intermediate register/Shift Row transformation circuit 206.

In cycles 009 through 012, Round Key Addition processing and Mix Column transformation processing are executed. Here, data stored in the intermediate register/Shift Row transformation circuit 206, while being shifted in 32-bit units, is read out and inputted into the second Round Key Addition circuit 208. At this time, data selected by the add data selector 209 is made the expanded key segment inputted from the key schedule unit. Also, with the selector position of the second selector 203 at "c", the output of the Mix Column transformation circuit 210 is inputted into the first Round Key Addition circuit 204 via the second selector 203. At this time, by making the data to be selected by the add data selector 205 "0", the first Round Key Addition circuit 204 is put into a masked state. In this case, Mix Column transformation processing is executed in such a manner as to be transformation processing that is the inverse of the transformation processing during encryption; this will be explained in detail below. Thus the 128-bit resultant of the Round Key Addition processing by the second Round Key Addition circuit 208 and of the Mix Column transformation processing by the Mix Column transformation circuit 210 is stored in the intermediate register/Shift Row transformation circuit 206. In this manner, one round of processing is executed in the 9 cycles of cycle 004 through 012.

Next, in rounds 2 through (Nr-1), the same processing as in round 1 is executed (however, Nr is the number of rounds including the final round, and as shown in Table 1, different numbers of rounds are stipulated depending on key length).

In round Nr (the final found), Shift Row transformation processing, Byte Sub transformation processing and Round Key Addition processing are executed.

For this reason in cycle (Nr*9−5), 128-bit Shift Row transformation processing is executed. At this time, the selector position of the second selector 203 may be any position, but in consideration of the processing of the next cycle, a position of "b" is preferable.

Next, in cycles (Nr*9−4) through (Nr*9−1), with the selector position of the second selector 203 at "b", data stored in the intermediate register/Shift Row transformation circuit 206, while being shifted in 32-bit units, is read out and inputted into the Byte Sub transformation circuit 207. At this time, by making the data to be selected by the 205 "0", the first Round Key Addition circuit 204 is put into a masked state. Result of the operation by the Byte Sub transformation circuit 207 is stored in order in the intermediate register/Shift Row transformation circuit 206 in 32-bit units. Thus Byte Sub transformation processing is conducted on 128 bits, and the result is stored in the intermediate register/Shift Row transformation circuit 206.

In cycles (Nr*9) through (Nr*9+3), Round Key Addition processing is executed. Here, by making the selector position of the second selector 203 "d", data stored in the intermediate register/Shift Row transformation circuit 206, while being shifted in 32-bit units, is read out and inputted into the first Round Key Addition circuit 204 via the second selector 203. At this time, by making the data to be selected by the add data selector 205 an expanded key segment inputted from the key schedule unit, 32-bit Round Key Addition processing by the first Round Key Addition circuit 204 can be executed. The result of the Round Key Addition processing in the first Round Key Addition circuit 204 is, while being shifted in 32-bit units, stored in the intermediate register/Shift Row transformation circuit 206. Thus in cycles (Nr*9) through (Nr*9+3), the 128-bit result of Round Key Addition processing is stored in the intermediate register/Shift Row transformation circuit 206. In this manner, the final round processing is executed in the 9 cycles from cycles (Nr*9−5) through (Nr*9+3).

Intermediate Value Register/Shift Row Transformation Circuit

FIG. 5 shows one embodiment of the intermediate value register/Shift Row transformation circuit.

In this constitution, 4 shift registers that process in 8-bit units are provided. The first shift register has 4 flip-flops, flip-flops 302, 304, 306 and 308, connected in series, and to each of the flip-flops 302, 304, 306, and 308 selectors 301, 303, 305, and 307, which select inputs, are respectively connected. Input data IN0 and the output of the flip-flop 302 are inputted into the first selector 301, and either one of these is inputted into the flip-flop 302. Similarly, into the second through fourth selectors 303, 305 and 307, the outputs of the previous-stage flip-flops 302, 304, and 306, as well as the outputs of the flip-flops 304, 306, and 308 are inputted, and one of these is inputted into the flip-flops 304, 306 and 308, respectively.

The second shift register has 4 flip-flops, flip-flops 312, 314, 316 and 318 connected in series; and to each of the flip-flops 312, 314, 316 and 318, selectors 311, 313, 315, and 317, which select input, are respectively connected. Input data IN1 and the outputs of the flip-flop 312 and the flip-flop 318 are inputted into the first selector 311, and one of these is inputted into the flip-flop 312. Similarly, into the second through fourth selectors 313, 315 and 317, the outputs of the previous-stage flip-flops 312, 314, and 316, as well as the outputs of the flip-flops 314, 316, and 318 are inputted, and one of these is inputted into the flip-flops 314, 316 and 318, respectively.

The third shift register has 4 flip-flops, flip-flops 322, 324, 326 and 328 connected in series; and to each of the flip-flops 322, 324, 326 and 328, selectors 321, 323, 325, and 327, which select input, are respectively connected. Input data IN2 and the outputs of the flip-flop 322 and the flip-flop 326 are inputted into the first selector 321, and one of these is inputted into the flip-flop 322. Similarly, into the second selector 323, the output of the respective previous-stage flip-flop 322, the output of the flip-flop 324, and the output of the flip-flop 328 are inputted, and one of these is inputted into the flip-flop324. Into the third selector 325, the output of the previous stage flip-flop 324, the output of the flip-flop 326, and the output of the flip-flop 322 are inputted, and one of these is inputted into the flip-flop 326. Into the fourth selector 327, the output of the previous stage flip-flop 326, the output of the flip-flop 328 and the output of the flip-flop 324 are inputted, and one of these is inputted into the flip-flop 328.

The fourth shift register has 4 flip-flops, flip-flops 332, 334, 336 and 338 connected in series; and to each of the flip-flops 332, 334, 336 and 338, selectors 331, 333, 335, and 337, which select input, are respectively connected. Input data IN3 and the outputs of the flip-flop 332 and the flip-flop 334 are inputted into the first selector 331, and one of these is inputted into the flip-flop 332. Similarly, into the second selector 333, the output of the previous-stage flip-flop 332, the output of the flip-flop 334, and the output of the flip-flop 336 are inputted, and one of these is inputted into the flip-flop334. Into the third selector 335, the output of the previous stage flip-flop 334, the output of the flip-flop 336, and the output of the flip-flop 338 are inputted, and one of these is inputted into the flip-flop 336. Into the fourth selector 337, the output of the previous stage flip-flop 336, the output of the flip-flop 338, and the output of the flip-flop 332 are inputted, and one of these is inputted into the flip-flop 338.

When an intermediate value register/Shift Row transformation circuit thus constituted is operated as an intermediate value register for the various processing stages, by inputting data into input data IN0 through IN3 in 8-bit units, data processed in each cycle in 32-bit units can be stored. Furthermore, by making the selector positions of the selectors 301 through 337 "b", and, while shifting the data in flip-flops to the next stage, inputting data in 8-bit units into input data IN0 through IN3 respectively, 128 bits of data can be inputted in 4 cycles. When the input of 128 bits of data has been completed, the 4 8-bit data inputted in the first cycle are latched in the flip-flops 308, 318, 328, and 338, respectively.

An explanation will now be given of the operations of the Shift Row transformation.

In the Rijndael algorithm, input data is segmented into 8-bit data segments a00 through a33 and these are processed as a matrix; the direction of the shift for decryption is the reverse of the direction for encryption. In the present invention, the order in which data is processed is the order of the column array; by processing in reverse order for encryption and for decryption, Shift Row transformation can be achieved using the same processing.

TABLE 4

Data Array and Processing Order

| | Row → | | | | ← Row | | |
|---|---|---|---|---|---|---|---|
| Column | | a01 | a02 | a03 | a00 | a01 | a02 | |
| | | a11 | a12 | a13 | Column | a10 | a11 | a12 | |
| | | a21 | a22 | a23 | | a20 | a21 | a22 | |
| | | a31 | a32 | a33 | | a30 | a31 | a32 | |
| | Encryption | | | | Decryption | | |

As shown on Table 4 left, when the data in rows is arranged in order starting from the column to the far left, for encryption, processing is executed starting from the column to the far left. For decryption, as seen in Table 4 right, processing is executed starting from the column to the far right.

In Shift Row transformation processing for encryption, the rows of a data array arranged as on Table 4 left are cyclically shifted different byte-lengths. Specifically, as shown in Table 5, the first row is not shifted, row 2 is cyclically shifted one byte to the left, row 3 is cyclically shifted 2 bytes to the left, and row 4 is cyclically shifted 3 bytes to the left. This causes the pre-processing state, shown in Table 5 left, to become the post-processing state shown in Table 5 right.

TABLE 5

[Encryption]

| Pre-processing | | | | | Post-processing | | | |
|---|---|---|---|---|---|---|---|---|
| a00 | a01 | a02 | a03 | | a00 | a01 | a02 | a03 |
| a10 | a11 | a12 | a13 | Cyclic Shift 1 Byte Left | a11 | a12 | a13 | a10 |
| a20 | a21 | a22 | a23 | Cyclic Shift 2 Bytes Left | a22 | a23 | a20 | a21 |
| a30 | a31 | a32 | a33 | Cyclic Shift 3 Bytes Left | a33 | a30 | a31 | a32 |

For decryption, so as to achieve the inverse of the processing during encryption, the rows of a data array arranged as on Table 4 left are cyclically shifted different byte-lengths. Specifically, as shown in Table 5, the first row is not shifted, row 2 is cyclically shifted 3 bytes to the left, row 3 is cyclically shifted 2 bytes to the left, and row 4 is cyclically shifted 1 byte to the left. This causes the pre-processing state, shown in Table 6 left, to become the post-processing state shown in Table 6 right.

TABLE 6

[Decryption]

| Pre-processing | | | | | Post-processing | | | |
|---|---|---|---|---|---|---|---|---|
| a00 | a01 | a02 | a03 | | a00 | a01 | a02 | a03 |
| a10 | a11 | a12 | a13 | Cyclic Shift 3 Bytes Left | a13 | a10 | a11 | a12 |
| a20 | a21 | a22 | a23 | Cyclic Shift 2 Bytes Left | a22 | a23 | a20 | a21 |
| a30 | a31 | a32 | a33 | Cyclic Shift 1 Byte Left | a31 | a32 | a33 | a30 |

In the present embodiment, the intermediate value register/Shift Row transformation circuit shown in FIG. 5 is used. Thus, at the stage when the input of 128 bits of data has been completed, the data that was inputted in the initial cycle is latched in the final stage flip-flops 308, 318, 328, and 338, and data is latched in order in the previous stage flip-flops. When data is to be outputted, as it is being shifted 1 byte to the right at one cycle, data is outputted from the final stage flip-flops at the far right. Therefore when data is rearranged in consideration of the fact that the data processing order starts from the far right, the state before Shift Row processing for encryption takes the form shown in Table 7 left.

TABLE 7

[Encryption]

| Pre-processing | | | | | Post-processing | | | |
|---|---|---|---|---|---|---|---|---|
| a03 | a02 | a01 | a00 | | a03 | a02 | a01 | a00 |
| a13 | a12 | a11 | a10 | Cyclic Shift 1 Byte Right | a10 | a13 | a12 | a11 |
| a23 | a22 | a21 | a20 | Cyclic Shift 2 Bytes Right | a21 | a20 | a23 | a22 |
| a33 | a32 | a31 | a30 | Cyclic Shift 3 Bytes Right | a32 | a31 | a30 | a33 |

To perform the same cyclic shift as in Table 5, as shown in Table 7 right, the first row is not shifted, the second row is cyclically shifted 1 byte to the right, the third row is cyclically shifted 2 bytes to the right, and the fourth row is cyclically shifted 3 bytes to the right.

In order to perform this kind of Shift Row transformation processing for encryption, the intermediate value register/Shift Row transformation circuit shown in FIG. 5 is used to switch and control the selectors, and to replace data at once, in 128-bit units.

For the first row, because a shift is unnecessary, the selector positions of the selectors 301, 303, 305 and 307 are set at "a". For the second row, because of the cyclic shift 1 byte to the right, the selector position of the selector 311 is set at "c", and the other selectors 313, 315, and 317 are set at selector position "b". For the third row, because of the cyclic shift 2 bytes to the right, the selector position of the selectors 321, 323, 325 and 327 is set at "c". For the fourth row, because of the cyclic shift 3 bytes to the right, the selector position of the selectors 331, 333, 335 and 337 is set at "c".

By designating the output data being latched by the flip-flops in the intermediate value register/Shift Row transformation circuit prior to execution of the above-described Shift Row transformation processing as b00 through b33 respectively, as shown in FIG. 5 the output data becomes latched to the output of the flip-flops in an array as shown in Table 8 right.

TABLE 8

Shift Row Transformation Operation Model

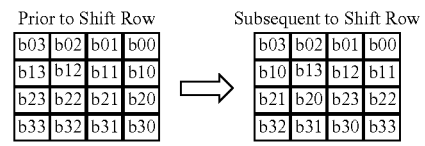

For decryption, because processing is executed from the right column as in Table 4, the data is arrayed as shown in Table 9 left.

TABLE 9

[Decryption]

| Pre-processing | | | | | Post-processing | | | |
|---|---|---|---|---|---|---|---|---|
| a00 | a01 | a02 | a03 | | a00 | a01 | a02 | a03 |
| a10 | a11 | a12 | a13 | Cyclic Shift 1 Byte Right | a13 | a10 | a11 | a12 |
| a20 | a21 | a22 | a23 | Cyclic Shift 2 Bytes Right | a22 | a23 | a20 | a21 |
| a30 | a31 | a32 | a33 | Cyclic Shift 3 Bytes Right | a31 | a32 | a33 | a30 |

To perform the same cyclic shift as in Table 6, as shown in Table 9 right, the first row is not shifted, the second row is cyclically shifted 1 byte to the right, the third row is cyclically shifted 2 bytes to the right, and the fourth row is cyclically shifted 3 bytes to the right.

Therefore, as during the above-described Shift Row transformation for encryption, by setting the selector values of the selectors in the intermediate value register/Shift Row transformation circuit and performing exactly the same processing as the cyclic shift for encryption as shown in Table 8, Shift Row transformation processing for decryption can be executed.

In this way, the same intermediate value register/Shift Row transformation circuit can be used for Shift Row transformation processing for both encryption and decryption.

Mix Column Transformation Circuit

Figure 6:
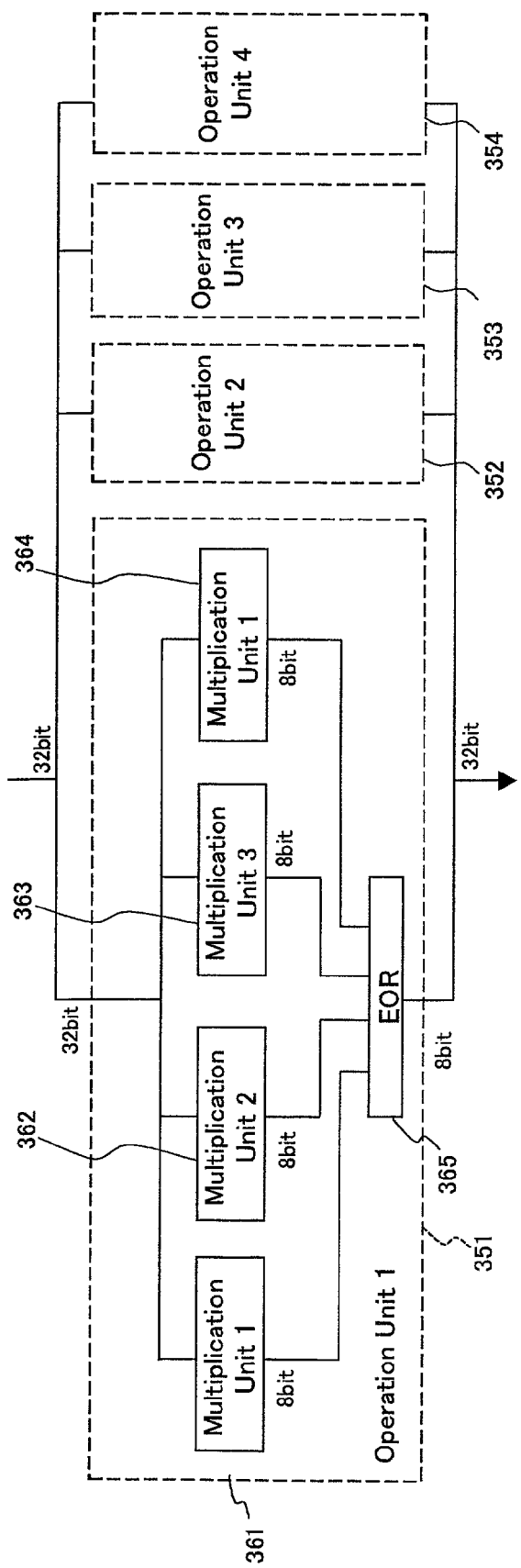
FIG. 6 is a block diagram showing a Mix Column transformation circuit.

The Mix Column transformation circuit adopted in this embodiment is shown in FIG. 6.

This Mix Column transformation circuit includes 4 operation units, a first operation unit 351, a second operation unit 352, a third operation unit 353 and a fourth operation unit 354. The first operation unit 351 comprises a first multiplication unit 361, a second multiplication unit 362, a third multiplication unit 363, and a fourth multiplication unit 364, each of which executes operations in 8-bit units, and an XOR circuit 365 that XORs the outputs of the multiplication units 361 through 364. The second operation unit 352, third operation unit 353, and the fourth operation unit 354, which are not shown in the figure, also have a first through fourth multiplication unit and an XOR circuit.

When a column j comprising (a0$j$, a1$j$, a2$j$, a3$j$) is transformed into a column comprising (b0$j$, b1$j$, b2$j$, b3$j$), the data (b0$j$, b1$j$, b2$j$, b3$j$) of column j after transformation can be expressed as follows.

Encryption $$b0j=02*a0j+03*a1j+01*a2j+01*a3j$$

$$b1j=01*a0j+02*a1j+03*a2j+01*a3j$$

$$b2j=01*a0j+01*a1j+02*a2j+03*a3j$$

$$b3j=03*a0j+01*a1j+01*a2j+02*a3j$$

Decryption $$b0j=0E*a0j+0B*a1j+0D*a2j+09*a3j$$

$$b1j=09*a0j+0E*a1j+0B*a2j+0D*a3j$$

$$b2j=0D*a0j+09*a1j+0E*a2j+0B*a3j$$

$$b3j=0B*a0j+0D*a1j+09*a2j+0E*a3j$$

The coefficients by which each column is multiplied are described as hexadecimal.

To execute this Mix Column transformation processing, the 32-bit data columns are inputted into the first through fourth operation units 351 through 354, respectively, and multiplication by the first through fourth operation units 361 through 364 and the operation by the XOR circuit are performed.

The multiplication units 361 through 364 of the operation units 351 through 361 are provided with a coefficient for encryption and a coefficient for decryption, so that they can be used for both encryption and decryption, and they are constituted so that selection of a coefficient can be made during operations.

The first multiplication unit 361 of the operation unit 351 can multiply inputted data by either 0×02 or 0×0E. The second multiplication unit 362 can multiply inputted data by either 0×03 or 0×0B. The third multiplication unit 363 can multiply inputted data by either 0×01 or 0×0D. The fourth multiplication unit 364 can multiply inputted data by either 0×01 or 0×09.

The first multiplication unit of the second operation unit 352 can multiply inputted data by either 0×01 or 0×09. The second multiplication unit can multiply inputted data by either 0×02 or 0×0E. The third multiplication unit can multiply inputted data by either 0×03 or 0×0B. The fourth multiplication unit can multiply inputted data by either 0×01 or 0×0D.

The first multiplication unit of the third operation unit 353 can multiply inputted data by either 0×01 or x0D. The second multiplication unit can multiply inputted data by either 0×01 or 0×09. The third multiplication unit can multiply inputted data by either 0×02 or 0×0E. The fourth multiplication unit can multiply inputted data by either 0×03 or 0×0B.

The first multiplication unit of the fourth operation unit 354 can multiply inputted data by either 0×03 or 0×0B. The second multiplication unit can multiply inputted data by either 0×01 or 0×0D. The third multiplication unit can multiply inputted data by either 0×01 or 0×09. The fourth multiplication unit can multiply inputted data by either 0×02 or 0×0E.

By changing the coefficients used for encryption and for decryption in the first through fourth multiplication units of the first through fourth operation units 351 through 354, the same circuit constitution can be shared for both encryption and decryption.

Multiplication Units of the Mix Column Transformation Circuit

Figure 7:
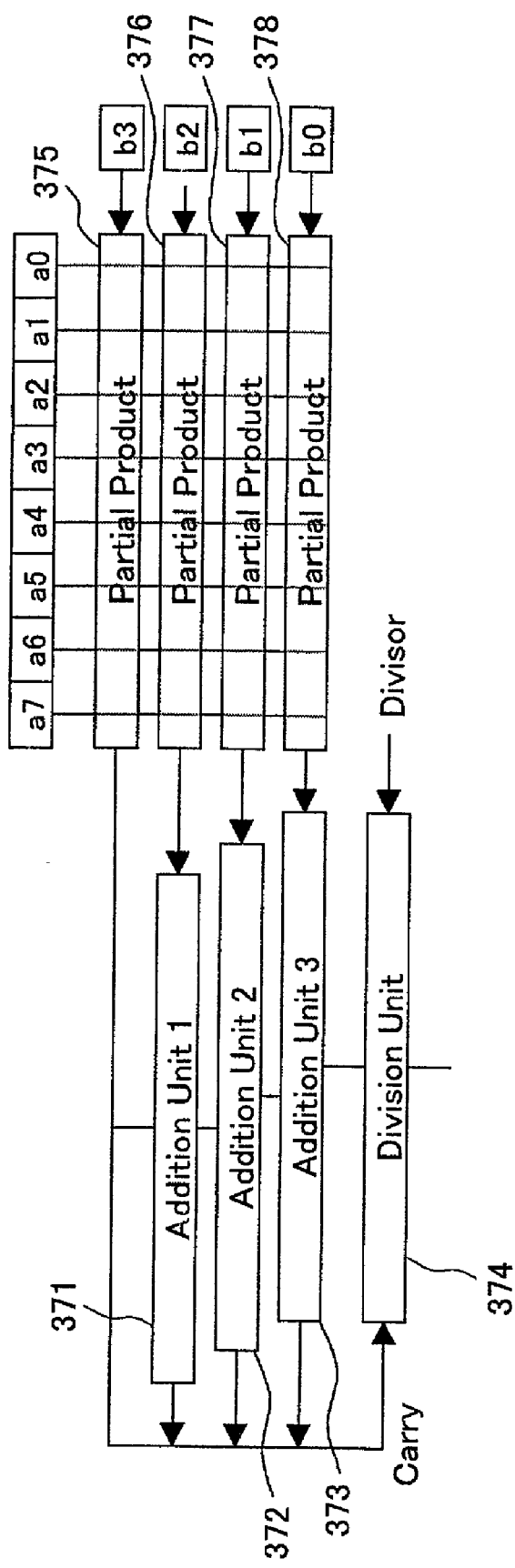
FIG. 7 is a block diagram showing the constitution of a multiplication unit.

An example of the multiplication units included in the Mix Column transformation circuit is shown in FIG. 7.

The multiplication units multiply inputted 8-bit data (a7, a6, a5, a4, a3, a2, a1, a0) with a coefficient (b3, b2, b1, b0). For this, partial product operation units 375 through 378 are provided, which multiply the 8-bit data (a7, a6, a5, a4, a3, a2, a1, a0) with each bit of a coefficient (b3, b2, b1, b0). Also provided are: an addition unit 371 that shifts the result of the partial product unit 376 1 bit and adds this to the result of the partial product unit 375, which multiplies using the highest bit of a coefficient; an addition unit 372 that shifts the resultant of the partial product unit 377 1 bit moreover and adds this; and an addition unit 373 that shifts the resultant of the partial product unit 378 1 bit moreover and adds this. There is also provided a division unit 374 into which the resultant of the addition unit 373 and overflow carried over from the addition units 371 to 373 are inputted and divided by a divisor.

With this constitution, by selectively setting as the coefficient (b3, b2, b1, b0) a coefficient for encryption and a coefficient for decryption, the mixed column transformation processing can be used both for encryption and for decryption.

As described above, there are 2 coefficients, set as (b3, b2, b1, b0), established for each multiplication unit. There are 4 combinations of coefficients in the multiplication units, namely, (0×02, 0×0E), (0×03, 0×0B), (0×01, 0×0D), (0×01, 0×09). When these are expressed as 4 low order bits, they become (0010, 1110), (0011, 1011), (0001, 1101), and (0001, 1001). The operations for common bits in these coefficients do not perform control of the partial products;

rather, the operations for different bits control the addition processing; this allows the circuit to be reduced in scale.

Figure 8:
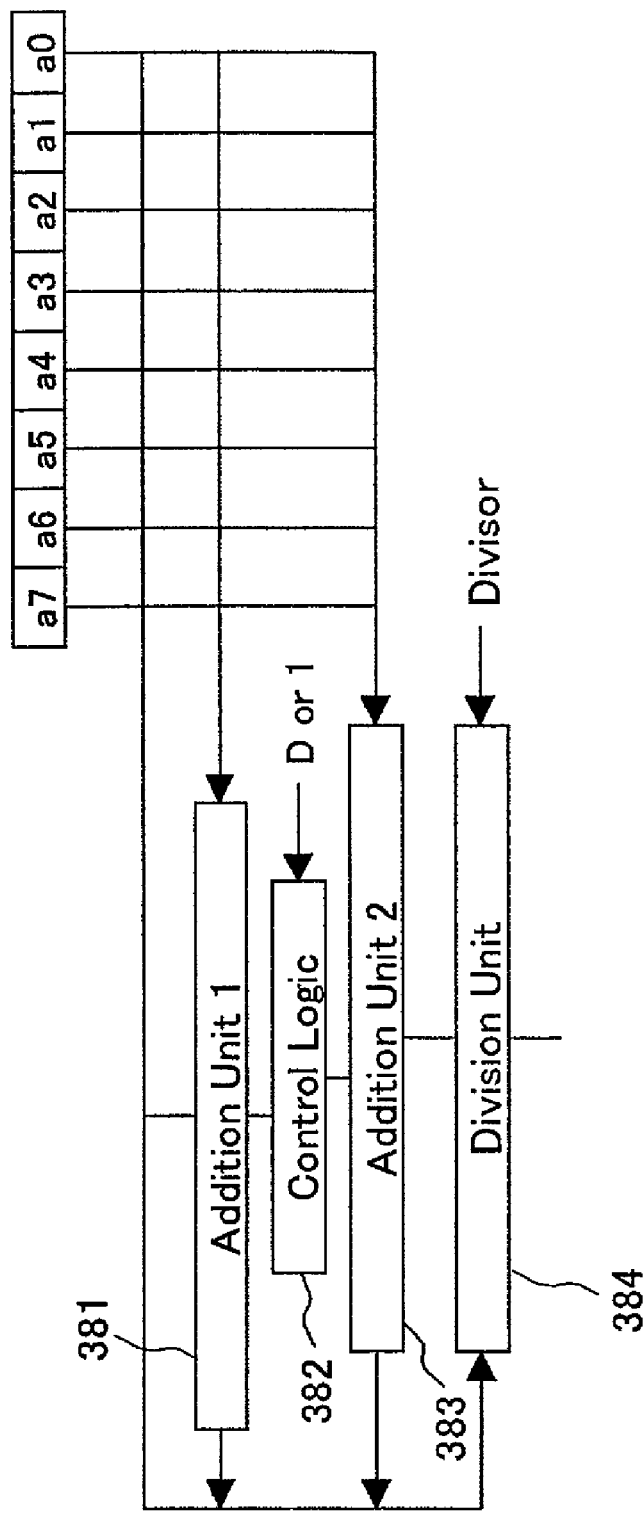
FIG. 8 is a block diagram showing another constitution of a multiplication unit.

For example, when the coefficients are the combination (0×01, 0×0D), they become (0001,1101) when expressed in binary; by controlling whether or not the result of the addition of the partial product of the 2 upper bits is added to the partial product of the lower 2 bits, the selection and multiplication of 2 coefficients becomes possible. FIG. 8 shows the circuit constitution for the coefficient combination (0×01, 0×0D).

In FIG. 8, a first addition unit 381 that shifts inputted 8-bit data (a7, a6, a5, a4, a3, a2, a1, a0) 1 bit and executes addition processing thereupon. The output of the first addition unit 381 is inputted into a second addition unit 383 via a control logic circuit 382. This second addition unit 383 adds the result of the partial product operation by the uppermost bit of the coefficient, and it is constituted to shift inputted 8-bit data 3 bits and execute addition processing thereupon.

A division unit 384 is provided into which the resultant of the operation of the addition unit 383 and the overflow carried over from the first addition unit 381 and the second addition unit 383 are inputted and divided by a divisor.

The control logic circuit 382, when a coefficient is 0×01, does not output the output of the addition unit 381, which is an upper 2-bit resultant. The control logic circuit 382 may be constituted so that, when a coefficient is 0×0D, the output of the first addition unit 381, which is an upper 2 bit result, is outputted to the addition unit 383.

Because the multiplication performed here is multiplication over $GF(2^8)$ where the irreducible polynomial is $M(x)=x^8+x^4+x^3+x+1$, and the addition is over $GF(2)$, they can be achieved with an XOR operation.

In this manner, by controlling the addition of partial products in different bits of 2 coefficients, the circuit scale can be made smaller, enabling reduction of the scale of circuit.

Key Schedule Unit

Figure 9:
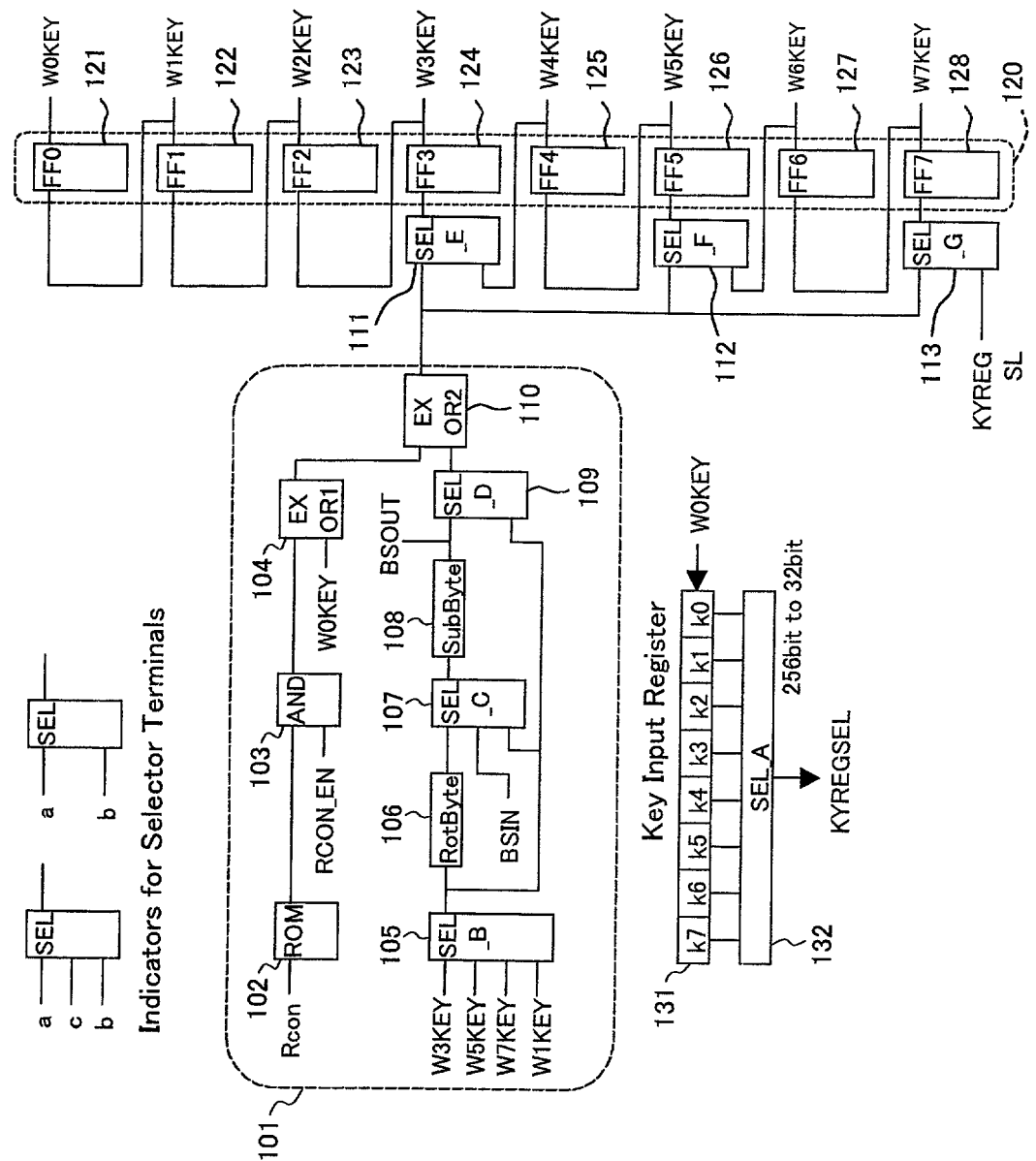
FIG. 9 is a block diagram showing a key schedule unit.

FIG. 9 shows the circuit constitution of the key schedule unit.

The key schedule unit comprises, primarily, an expanded key generation logic unit 101, an expanded key register 120 and a key input register 131.

The key input register 131 is a 256-bit register comprising 8 32-bit registers k0 through k7, and a cipher key is stored in 32-bit units starting from register k0 and proceeding in order therefrom. When the cipher key is 256 bits, data is stored in all the registers k0 through k7; when the cipher key is 192 bits, data is stored in registers k0 through k5, and when the cipher key is 128 bits, data is stored in registers k0 through k3.

A selector 132 that selectively outputs one value from the registers k0 through k7 is connected to the key input register 131. This selector 132 selects 32 bits of data from the 256-bit data of the key input register 131 and inputs this at the lowest position of the expanded key register 120.

The expanded key register 120 is a shift register to which are connected in series 8 flip-flops 121 through 128, which are capable of processing in 32-bit units. Inputted into the flip-flop 128, which is at the lowest position, is the output of the selector 113, which selects the output of the selector 132 and the output of the expanded key generation logic unit 101. The output W7Key of the flip-flop 128 is inputted into the flip-flop 127. The output W6Key of the flip-flop 127 is inputted into the selector 112, which is at the stage previous to the flip-flop 126. Inputted into the selector 112 is the output W6KEY of the flip-flop 127 and the output of the expanded key generation logic unit 101, and one of these is inputted into the flip-flop 126.

The output W5KEY of the flip-flop 126 is inputted into the flip-flop 125. The output W4Key of the flip-flop 125 is inputted into the selector 111, which is at the stage previous to the flip-flop 124. Inputted into the selector 111 is the output W4KEY of the flip-flop 125 and the output of the expanded key generation logic unit 101, and one of these is inputted into the flip-flop 124.

The output W3KEY of the flip-flop 124 is inputted into the flip-flop 123. The output W2KEY of the flip-flop 123 is inputted into the flip-flop 122. The output W1KEY of the flip-flop 122 is inputted into the flip-flop 121.

The expanded key generation logic unit 101 includes a ROM 102 in which an expanded key generation constant Rcon is stored, an AND circuit 103 that ANDs a value read out from the ROM 102 and a signal RCON_EN, and an XOR circuit 104 which XORs the W0KEY of the flip-flop 121 positioned at the top of the expanded key register 120 and the output of the AND circuit 103, which have been inputted therein.

The expanded key generation logic unit 101 also includes a selector 105, into which the flip-flop 122 output W1KEY, the flip-flop 124 output W3KEY, the flip-flop 126 output W5KEY, and the flip-flop 128 output W7KEY are inputted, and which selectively outputs one of these. The output of the selector 105 is inputted into the Rot Byte circuit 106, which rotates data, the selector 107, and selector 109. The output of the Rot Byte circuit 106 and the output of the selector 105 are inputted into the selector 107, which supplies one of these to the Sub Byte circuit 108. The Sub Byte circuit 108 executes Byte Sub transformation processing in 32-bit portions, and supplies the output thereof to the selector 109. Into the selector 109 are inputted the output of the Sub Byte circuit 108 and the output of the selector 105, one of which it outputs. The expanded key generation logic unit 101 also includes an XOR circuit 110. The output of the XOR circuit 104 and the output of the selector 109 are inputted into the XOR circuit 110, which then XORs these outputs.

A key schedule unit thus constituted includes such functions as: 1) generation of the expanded key used in the Round Key Addition processing of the round function unit; 2) rewrite of the key input register during encryption, and setup of the expanded key initial value following completion of encryption and decryption; and 3) setup of expanded key initial value following rewrite of the key input register during decryption.

The round keys used in Round Key Addition processing of the round function unit must total 15, from the initial round key and round key 01 through round key 14, when the key length is 256 bits. Each round key is made up of 128 bits, in correspondence with the processing block length; in order to assign the round keys to the 32-bit expanded key segments generated by the key schedule unit, a total of 60 expanded key segments W00 through W59 are required. These expanded key segments W00 through W59 are used in the order W00→W59 for encryption, and in the order W59→W00 for decryption. In this embodiment, as shown in Table 10. expanded key segments are generated in the order W00→W59 for encryption, and in the order W59→W00 during decryption.

TABLE 10

Expansion Key Schedule (This Example for 256-Bit Key Length)

| No. | Encryption | Decryption | |
|---|---|---|---|
| 00 | W00=(k0) | W59 | ⎫ |
| 01 | W01=(k1) | W58 | ⎬ Initial |
| 02 | W02=(k2) | W57 | ⎬ Round Key |
| 03 | W03=(k3) | W56 | ⎭ |
| 04 | W04=(k4) | W55 | ⎫ |
| 05 | W05=(k5) | W54 | ⎬ Round |
| 06 | W06=(k6) | W53 | ⎬ Key01 |
| 07 | W07=(k7) | W52 | ⎭ |
| 08 | W08=W00^Sub Byte(Rot Byte(W07))^Rcon[1] | W51=W59^W58 | ⎫ |
| 09 | W09=W01^W08 | W50=W58^W57 | ⎬ Round |
| 10 | W10=W02^W09 | W49=W57^W56 | ⎬ Key02 |
| 11 | W11=W03^W10 | W48=W56^Sub Byte(Rot Byte(W55))^Rcon[7] | ⎭ |
| 12 | W12=W04^Sub Byte(W11) | W47=W55^W54 | ⎫ |
| 13 | W13=W05^W12 | W46=W54^W53 | ⎬ Round |
| 14 | W14=W06^W13 | W45=W53^W52 | ⎬ Key03 |
| 15 | W15=W07^W14 | W44=W52^Sub Byte(W51) | ⎭ |
| 16 | W16=W08^Sub Byte(Rot Byte(W15))^Rcon[2] | W43=W51^W50 | ⎫ |
| 17 | W17=W09^W16 | W42=W50^W49 | ⎬ Round |
| 18 | W18=W10^W17 | W41=W49^W48 | ⎬ Key04 |
| 19 | W19=W11^W18 | W40=W48^Sub Byte(Rot Byte(W47))^Rcon[6] | ⎭ |
| 20 | W20=W12^Sub Byte(W19) | W39=W47^W46 | ⎫ |
| 21 | W21=W13^W20 | W37=W46^W45 | ⎬ Round |
| 22 | W22=W14^W21 | W36=W45^W44 | ⎬ Key05 |
| 23 | W23=W15^W22 | W35=W44^Sub Byte(W43) | ⎭ |
|  | Omitted |  |  |
| 52 | W52=W44^Sub Byte(W51) | W07=W15^W14 | ⎫ |
| 53 | W53=W45^W52 | W06=W14^W13 | ⎬ Round |
| 54 | W54=W46^W53 | W05=W13^W12 | ⎬ Key13 |
| 55 | W55=W47^W54 | W04=W12^Sub Byte(W11) | ⎭ |
| 56 | W56=W48^Sub Byte(Rot Byte(W55))^Rcon[7] | W03=W11^W10 | ⎫ |
| 57 | W57=W49^W56 | W02=W10^W09 | ⎬ Round |
| 58 | W58=W50^W57 | W01=W09^W08 | ⎬ Key14 |
| 59 | W59=W51^W58 | W00=W08^Sub Byte(Rot Byte(W07))^Rcon[1] | ⎭ |

The expanded key segment W08 for encryption, in accordance with the formula W08=W00^Sub Byte(Rot Byte (W07))^Rcon[1], is obtained by XORing W00, Sub Byte (Rot Byte(W07) and the constant Rcon[1]. Because A^A=A, the expanded key segment W00 can be expressed as W00=W08^Sub Byte(Rot Byte(W07))^Rcon[1], meaning that W00 can be generated from W08 and W07. Thus, for decryption, first W00=>W59 are generated, and then in the order that is the inverse of encryption, i.e., W59=>W00, expanded key segments are generated. In this manner, there is no need to store all the expanded keys for decryption in memory, making possible decryption processing wherein only the expanded key segments needed for each round are generated.

An explanation will first be given of the generation of expanded key segments for the Round Key Addition function of the round function unit.

As shown in Table 10, in the Round Key Addition function in each round, 4 expanded key segments having 32 bits are used; because expanded key operations are performed in the background of the Mix Column transformation+Round Key Addition function of the round function, 4 expanded key segments may be created in 4 cycles. For this reason, in a circuit constitution as shown in FIG. 9, 1 expanded key segment is generated in 1 cycle. The expanded key segment register 120 comprises a shift register, and the expanded key segments currently being used in a round function use the output W0KEY of the flip-flop 121.

The selector 105 (SEL_B) of the expanded key generation logic unit 101, as shown in Table 11, is controlled so as to switch depending upon 2 different types of conditions, namely, key length and encryption/decryption. The selectors 111, 112, and 113 (SEL_E through SEL_G), into which the output of the expanded key generation logic unit 101 is inputted, are set based on key length, as shown in Table 12. However, when a cipher key is inputted as an initial value, "b" is selected as the selector position for the selectors 111 through 113. The selectors 107 and 109 (SEL_C, SEL_D), as shown in Table 13, are controlled so as to switch depending upon the expanded key generation logic. The ROM 102 stores the constant Rcon[i], which is inputted to the XOR circuit 104, and the constant Rcon[i] corresponding to the address "i" is stored as shown in Table 14.

TABLE 11

SEL_B Control

| Key length | Encryption | Decryption |
|---|---|---|
| 128 bit | W3KEY | W1KEY |
| 192 bit | W5KEY | W1KEY |
| 250 bit | W7KEY | W1KEY |

TABLE 12

SEL_E through SEL_G Control

| Key length | SEL_E | SEL_F | SEL_G |
|---|---|---|---|
| 128 bit | a | b | b |
| 192 bit | b | a | b |
| 256 bit | b | b | a |

TABLE 13

SEL_C, SEL_D Control

| | Logic | SEL_C | SEL_D |
|---|---|---|---|
| Expanded key | W[i]=W[i−Nk]W[i−1] | * | b |
| | W[i]=W[i−Nk]Sub Byte(W[i−1]) | b | a |
| | W[i]=W[i−Nk]Sub Byte(Rot Byte(W[i−1]))Rcon[i/Nk] | a | a |
| Byte Sub | | c | b |

*don't care

TABLE 14

Rcon ROM Table

| Rcon_Addr | Hex | Bin |
|---|---|---|
| 01 | 0x01 | 0000_0001 |
| 02 | 0x02 | 0000_0010 |
| 03 | 0x04 | 0000_0100 |
| 04 | 0x08 | 0000_1000 |
| 05 | 0x10 | 0001_0000 |
| 06 | 0x20 | 0010_0000 |
| 07 | 0x40 | 0100_0000 |
| 08 | 0x80 | 1000_0000 |
| 09 | 0x1B | 0001_1011 |
| 10 | 0x36 | 0011_0110 |

An explanation will be given of circuit operations when the key length is 256 bits, as shown in Table 10. Prior to operation of the round function, through the loading of the values of the registers k0 through k7 of the key input register 131, the initial values from No. 00 through No. 07 are set in the flip-flops 121 through 128 of the expanded key register 120.

The expanded key segment W08 for encryption is computed, as shown in Table 10, with the operation W08=W00^Sub Byte(Rot Byte(W07))^Rcon[1]. At the beginning of this operation W08=W00^Sub Byte(Rot Byte (W07))^Rcon[1], W00 is set at the output W0KEY of the flip-flop 121 and inputted into the XOR circuit 104. W07 is set at the output W7Key of the flip-flop 128, and this W07 is inputted into the selector 105 (SEL_B).

The Rcon address of the ROM 102 is made "1" and the signal RCON_EN to be inputted into the AND circuit 103 is enabled; the Rcon[1]^W00 operation is performed by the XOR circuit 104, and the result thereof is inputted into the XOR circuit 110. Meanwhile, W07, having passed through the selector 105 (SEL_B), is processed by the Rot Byte circuit 106 and the Sub Byte circuit 108; the result of the Sub Byte(Rot Byte(W07)) operation is inputted into the XOR circuit 110. Thus the XOR circuit 110 performs the W08=W00^Sub Byte(Rot Byte(W07))^Rcon[1] operation.

An explanation will next be given of the expanded key segment W09=W01^W08 operation processing. At the beginning of the W09=W01^W08 operation, W01 is set at the output W0KEY of the flip-flop 121 and then inputted into the XOR circuit 104. W08 is set at the output W7KEY of the flip-flop 128, and inputted into the selector 105 (SEL_B). The signal RCON_EN to be inputted into the AND circuit 103 is disabled, and W01 to be inputted from the flip-flop 121 is set so as to inputted into the XOR circuit 110. At this time, the selector 109 (SEL_D) is set at selector position "b", and W08, having passed through the selector 105 (SEL_B), is inputted into the XOR circuit 110.

Thus the XOR circuit 110 performs the W09=W01^W08 operation. The operations for W10, W11 and W13 through W15 are performed along the same path.

The expanded key segment W12 operation processing will now be explained. The expanded key operation W12=W04^Sub Byte(W11) is performed; at the beginning of this operation, W04 is set at the output W0KEY of the flip-flop 121, and inputted into the XOR circuit 104. W11 is set at the output W7KEY of the flip-flop 128, and inputted into the selector 105 (SEL_B). The signal RCON_EN to be inputted into the AND circuit 103 is disabled, and W04 is set so as to be inputted into the XOR circuit 104. Meanwhile, the selector position of the selector 107 (SEL_C) is set at "b", and W11, having passed through the selector 105 (SEL_B), is inputted into the Sub Byte circuit 108 via the selector 107 (SEL_C). Thus the Sub Byte circuit 108 performs Sub Byte processing, and the result of the Sub Byte(W11) operation is inputted into the XOR circuit 110. Thus the XOR circuit 110 performs the W12=W04^Sub Byte(W11) operation.

In the above manner, operations for all the expanded key segments are performed.

Next, an explanation will be made of the rewrite of the key input register 131 for encryption and the setup of the expanded key initial following completion of encryption and decryption. This setup operation is an operation in preparation for the subsequent encryption or decryption, in which an expanded key initial value is transmitted to the expanded key register 120.

An expanded key initial value set at the key input register 131 undergoes 32-bit unit data selection by the selector 132 (SEL_A), and is set at the expanded key register 120 via the selection position "b" of the selector 113 (SEL_G). The expanded key register 120 is constituted as the shift register described above, shifting data along the direction of flip-flop 128 (FF7) =>flip-flop 127 (FF6)=>flip-flop 126 (FF5)=>flip-flop 125 (FF4)=>flip-flop 124 (FF3)=>flip-flop 123 (FF2)=>flip-flop 122 (FF1)=>flip-flop 121 (FF0), transmitting all the expanded key initial values in 8 cycles. The key input data to be selected by the selector 132 (SEL_A) is in the order of the registers k0, k1, k2, k3, k4, k5, k6, k7 of the key input register 131.

An explanation will be given of expanded key initial value setup following the rewrite of the key input register 131 for decryption. As shown in Table 10, in decryption, the expanded key initial value must be made the final expanded key segment set during encryption, namely W59 through W52. Through the rewrite of the key input register 131, the data that is set at the key input register 131 is, in the manner described above, first transmitted to the expanded key register 120, and in accordance with the expanded key generation logic for encryption, the circuit of FIG. 9 is caused to operate up through the final expanded key segment set, namely W52 through W59.

As this final expanded key segment set is being generated, during generation of W52, W52 is transmitted to the register k7 of the key input register 131; during generation of W53, W53 is transmitted to the register k6; during generation of W54, W54 is transmitted to the register k5; during generation of W55, W55 is transmitted to the register k4; during generation of W56, W56 is transmitted to the register k3; during generation of W57, W57 is transmitted to the register k2; during generation of W58, W58 is transmitted to the register k1; during generation of W59, W59 is transmitted to the register k0; thus the final expanded key segment is set in the reverse order in the key input register 131. Moreover, by transmitting the final expanded key segment set of the key input register 131 to the expanded key register 120 in the manner described above, the setup of the expanded key initial value following the rewrite of the key input register during decryption is completed.

Thereafter, the selector 105 (SEL_B), selector 107 (SEL_C), selector 109 (SEL_D), and selectors 111 through 113 (SEL_E through SEL_G) are set at selector positions as shown in Tables 11 through 13, and the expanded key segments needed for decryption are generated in order.

Shared Use of the Byte Sub Transformation Circuit

Because the above-described Sub Byte processing of the key schedule unit and Byte Sub transformation processing of the round function unit both execute Byte Sub transformation processing in 32-bit units, a single circuit can be used for both these processings.

For example, let us consider using the Byte Sub circuit 108 provided in the key schedule unit shown in FIG. 9 as the Byte Sub transformation circuit of the round function unit.

The input BSIN into the Byte Sub circuit 207 from the intermediate register/Shift Row transformation circuit 206 in the round function unit shown in FIG. 4 connects with selector position "c" of the selector 107 of the expanded key generation logic unit 101 shown in FIG. 9. The output from the Sub Byte circuit 108 of the expanded key generation logic unit 101 connects to the selector 203 as the output BSOUT of the Byte Sub transformation circuit 207 of FIG. 4.

When using the Sub Byte circuit 108 to perform Byte Sub transformation processing, as shown in Table 13, with the selector position of the selector 107 (SEL_C) at "c", the selector position of the selector 109 (SEL_D) is set at "b". In this manner, the Sub Byte circuit 108 of the expanded key generation logic unit 101 can be used to execute the Byte Sub transformation processing of the round function unit.

Byte Sub Transformation Circuit

Byte Sub transformation processing is a combination of an inverse operation in 8-bit units and a matrix operation; for encryption, after the performance of an inverse operation, a matrix operation is performed; for decryption, after the performance of a matrix operation, an inverse operation is performed. In order to implement such Byte Sub transformation processing using a common circuit for both encryption and decryption, a circuit as shown in FIG. 10 is hereby proposed.

Figure 10:
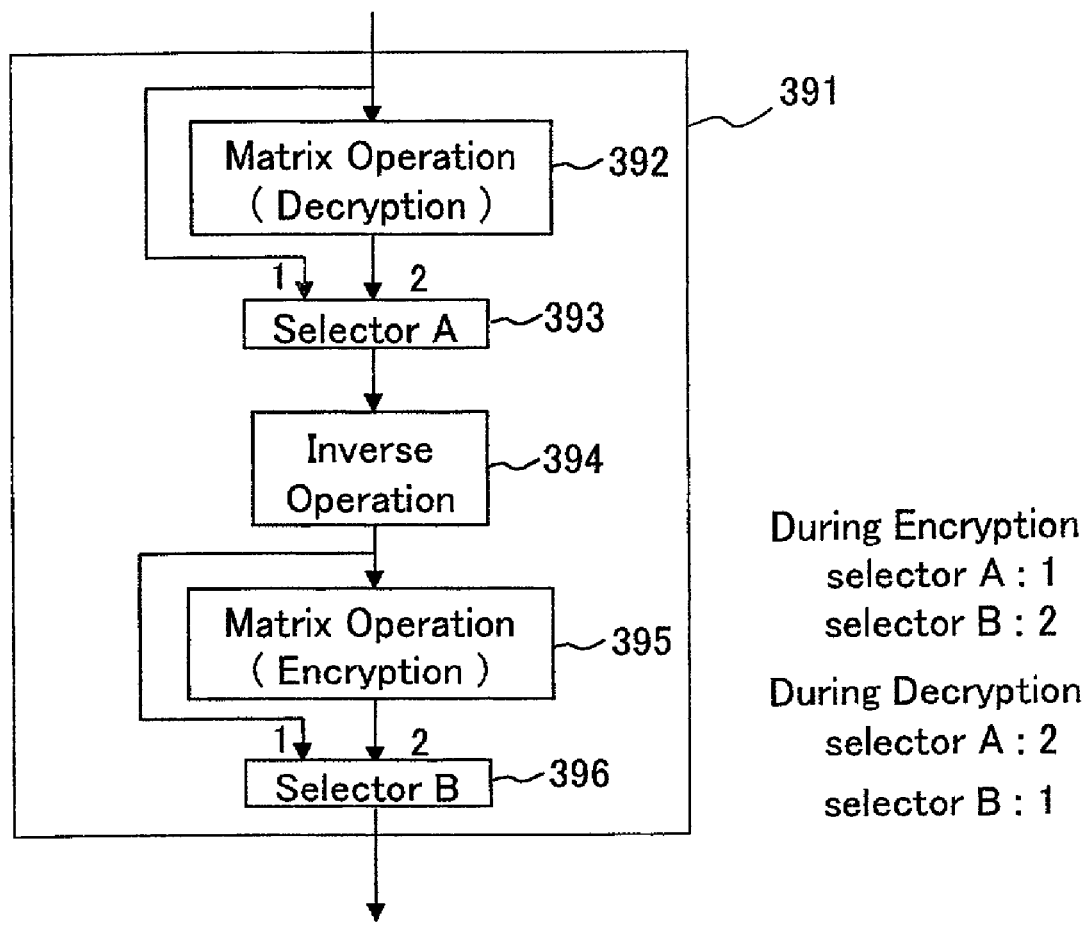
FIG. 10 is a block diagram showing a Byte Sub transformation circuit.

A Byte Sub transformation circuit 391 as shown in FIG. 10 comprises a matrix operation circuit for decryption 392, a selector 393, an inverse operation circuit 394, a matrix operation for encryption 395, and a selector 396.

The selector 393 is constituted so that input data and the output of the inverse operation circuit 392 are inputted therein, of which one is inputted to the inverse operation circuit 394. The selector 396 is constituted so that the output of the inverse operation circuit 394 and the output of the matrix operation for the encryption circuit 395 is inputted therein, of which one is outputted.

During encryption, the selector 393 is on the input data side, and the selector 396 is on the matrix operation for encryption 395 side. During decryption, the selector 393 is on the matrix operation for decryption 392 side, and the selector 396 is on the inverse operation circuit 394 side. In this manner, Byte Sub transformation processing for encryption and Byte Sub transformation processing for decryption can be accomplished using a common circuit constitution.

The matrix operation for encryption can be expressed as the following expression 1.

$$\begin{pmatrix} y_0 \\ y_1 \\ y_2 \\ y_3 \\ y_4 \\ y_5 \\ y_6 \\ y_7 \end{pmatrix} = \begin{pmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{pmatrix} \begin{pmatrix} x_0 \\ x_1 \\ x_2 \\ x_3 \\ x_4 \\ x_5 \\ x_6 \\ x_7 \end{pmatrix} + \begin{pmatrix} 1 \\ 1 \\ 0 \\ 0 \\ 0 \\ 1 \\ 1 \\ 0 \end{pmatrix} \quad \text{[Expression 1]}$$

As it is expanded, it can be expressed as the following expression 2. The "+" below means an XOR operation.

$$\begin{aligned}
y_0 &= x_0 \qquad\qquad\qquad +x_4 +x_5 +x_6 +x_7 +1 \\
y_1 &= x_0 +x_1 \qquad\qquad\qquad +x_5 +x_6 +x_7 +1 \\
y_2 &= x_0 +x_1 +x_2 \qquad\qquad\qquad +x_6 +x_7 \\
y_3 &= x_0 +x_1 +x_2 +x_3 \qquad\qquad\qquad +x_7 \\
y_4 &= x_0 +x_1 +x_2 +x_3 +x_4 \\
y_5 &= \qquad +x_1 +x_2 +x_3 +x_4 +x_5 \qquad\qquad +1 \\
y_6 &= \qquad\qquad +x_2 +x_3 +x_4 +x_5 +x_6 \qquad +1 \\
y_7 &= \qquad\qquad\qquad +x_3 +x_4 +x_5 +x_6 +x_7
\end{aligned} \quad \text{[Expression 2]}$$

The matrix operation for decryption can be expressed as the following expression 3.

$$\begin{pmatrix} y_0 \\ y_1 \\ y_2 \\ y_3 \\ y_4 \\ y_5 \\ y_6 \\ y_7 \end{pmatrix} = \begin{pmatrix} 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \\ 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \end{pmatrix} \begin{pmatrix} x_0 \\ x_1 \\ x_2 \\ x_3 \\ x_4 \\ x_5 \\ x_6 \\ x_7 \end{pmatrix} + \begin{pmatrix} 1 \\ 0 \\ 1 \\ 0 \\ 0 \\ 0 \\ 0 \\ 0 \end{pmatrix} \quad \text{[Expression 3]}$$

As this is similarly expanded, it can be expressed as the following expression 4.

$$\begin{aligned}
y_0 &= \qquad\qquad x_2 \qquad\qquad +x_5 \qquad +x_7 +1 \\
y_1 &= x_0 \qquad\qquad +x_3 \qquad\qquad +x_6 \\
y_2 &= \qquad x_1 \qquad\qquad +x_4 \qquad\qquad +x_7 +1 \\
y_3 &= x_0 \qquad +x_2 \qquad\qquad +x_5
\end{aligned} \quad \text{[Expression 4]}$$

-continued $$y_4 = x_1 + x_3 + x_6$$

$$y_5 = x_2 + x_4 + x_7$$

$$y_6 = x_0 + x_3 + x_5$$

$$y_7 = x_1 + x_4 + x_6$$

Figure 11:
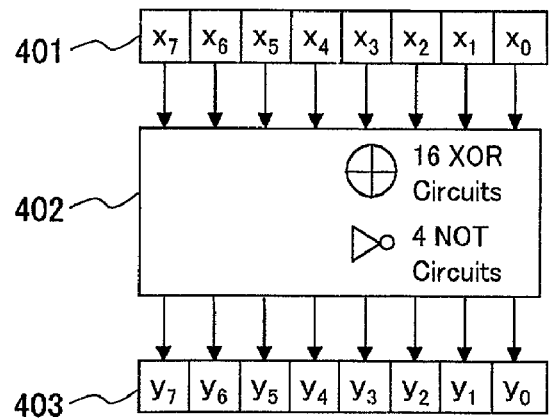
FIG. 11 is a block diagram showing a matrix operation circuit for encryption.

An example of a matrix operation circuit for encryption is shown in FIG. 11.

This circuit comprises an 8-bit input register 401, an output register 403, and a logic circuit 402 comprising XOR and NOT gates. The execution of the XOR operation shown in expression 2 for encryption can be achieved through 16 XOR gates and 4 NOT gates by having XOR circuits in the logic circuit 402 share overlapping operations.

Figure 12:
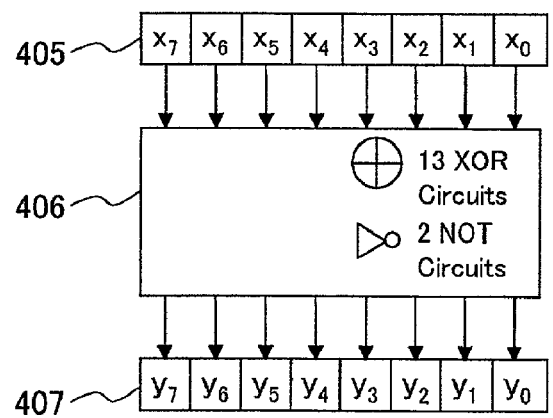
FIG. 12 is a block diagram showing a matrix operation circuit for decryption.

An example of a matrix operation circuit for decryption is shown in FIG. 12.

Similar to the matrix operation circuit for encryption, this circuit comprises an 8-bit input register 405, an output register 407 and a logic circuit 406 comprising XOR and NOT gates. As with the matrix operation circuit for encryption, the execution of the XOR operation shown in expression 2 for encryption can be achieved through 13 XOR gates and 2 NOT gates by having XOR circuits in the logic circuit 406 share overlapping operations.

Figure 13:
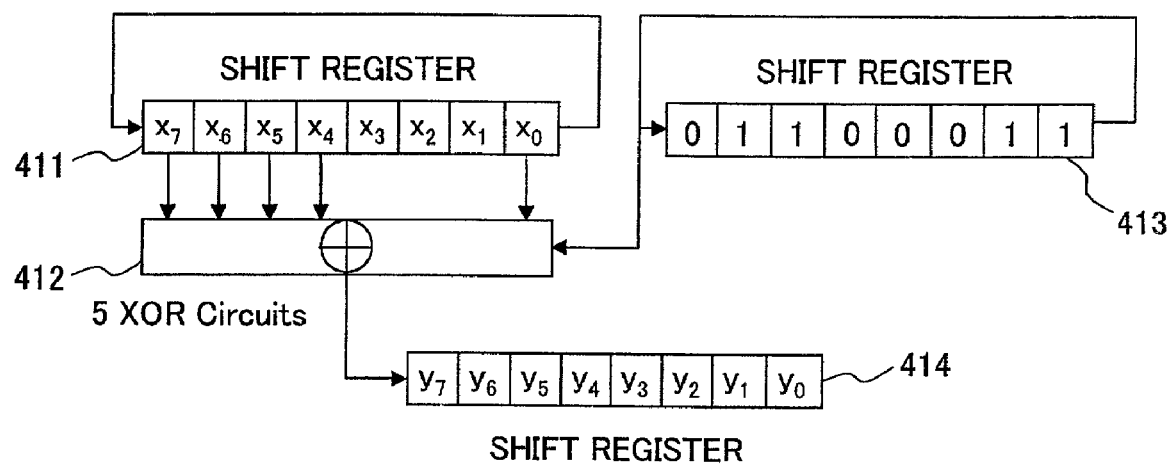
FIG. 13 is a block diagram showing another example of a matrix operation circuit for encryption.

Another example of a matrix operation circuit for encryption is shown in FIG. 13.

This matrix operation circuit for encryption comprises an input register 411, an output register 414, a shift register for holding constants 413, and a logic circuit 412 comprising XOR circuits. The input register 411, output register 414 and a register for holding constants 413 are all 8-bit shift registers that are synchronized with a clock to make cyclic shifts 1 bit to the right.

The constants in the first right column of expression 1 are constituted so that each line has 3 0's and 5 1's and shifts 1 bit at a time. Then, as bits x0, x4, x5, x6, x7 of the input register 411 are cyclically shifted, they are inputted into the logic circuit 412 and XORed; thus the matrix operation of the first right column of expression 1 is performed.

The constants in the second column from the right in expression 1 are set in the register for holding constants 413, starting from the lower bits. As the values of the register for holding constants 413 are cyclically shifted, the values of the lowest-order bits are inputted into the logic circuit 412 and XOR operations are performed; thus the matrix operation of the second column from the right of expression 1 is performed.

When data is set at the input register 411 in this manner, at the first clock cycle operations are performed on y0, and the result is then stored in the output register 414. At the next clock cycle operations are performed on y1, and the result is then stored in the output register 414. Operations are then performed in order so that with 8 clock cycles the operations on (y7, y6, y5, y4, y3 y2, y1 y0) are completed. The logic circuit 412 can in this case execute the operation processing of expression 2 using 5 XOR circuits.

Figure 14:
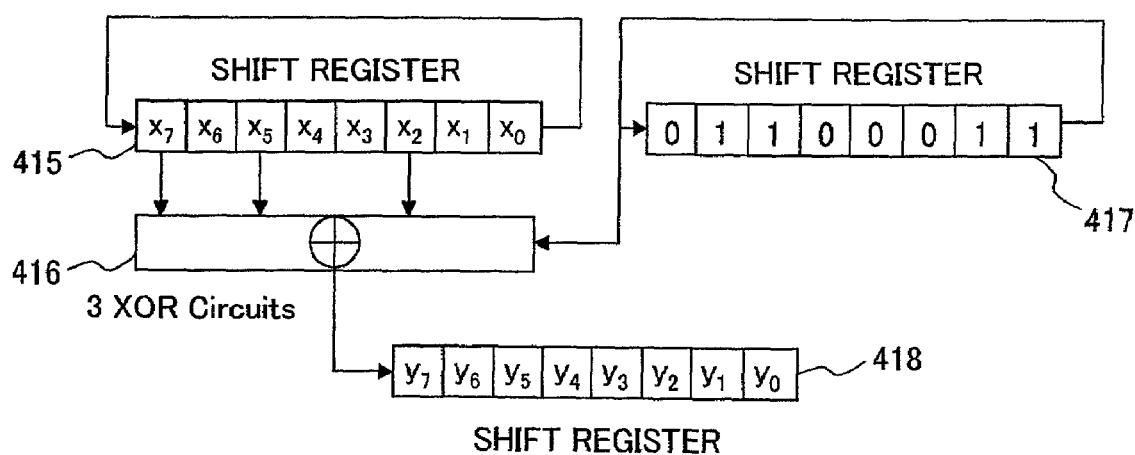
FIG. 14 is a block diagram showing another example of a matrix operation circuit for decryption.

An example of another matrix operation circuit for decryption, with a similar constitution, is shown in FIG. 14.

This matrix operation circuit for decryption comprises an input register 415, an output register 418, a register for holding constants 417 and a logic circuit 416 comprising XOR circuits. The input register 415, output register 418, and register for holding constants 417 are all 8-bit shift registers that are synchronized with a clock to make cyclic shifts 1 bit to the right.

The constants in the first right column of expression 3 are constituted so that each line has 3 0's and 5 1's and shifts 1 bit at a time. Then, as bits x2, x5, x7 of the input register 415 are cyclically shifted, they are inputted into the logic circuit 416 and XORed; thus the matrix operation of the first right column of expression 3 is performed.

The constants in the second column from the right in expression 3 are set in the register for holding constants 417, starting from the lower bits. As the values of the register for holding constants 417 are cyclically shifted, the value of the lowest-order bits is inputted into the logic circuit 416 and XOR operations are performed; thus the matrix operation of the second column from the right of expression 3 is performed.

When data is set at the input register 415 in this manner, at the first clock cycle, operations are performed on y0, and the result is then stored in the output register 418. Operations are then performed in order so that with 8 clock cycles the operations on (y7, y6, y5, y4, y3 y2, y1 y0) are completed. The logic circuit 418 can in this case execute the operation processing of expression 4 using 3 XOR circuits.

The use of the present invention enables the implementation of the AES block cipher algorithm in a compact circuit through the division of data to be processed by specified circuits into predetermined execution block lengths. Also, through the sharing of circuits for processing for encryption as circuits for processing for decryption, as well as the sharing of some circuits by key schedule unit and the round function unit, the scale of circuit can be further reduced.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An encryption circuit that generates from a cipher key a plurality of round keys having a number of bits corresponding to a predetermined processing block length and executing, for each processing block length, input data and round key encryption/decryption processing, by means of a round function unit comprising an XOR operation unit that XORs the input data and one of the round keys and a round processing unit that iterates round processing that includes Byte Sub transformation, Mix Column transformation and Round Key Addition, which are executed at execution block length that is smaller than said predetermined processing block length, the round processing further including Shift Row transformation which is performed on data having the predetermined processing block length, wherein:

said round processing unit comprises:

a first selector that segments input data having the predetermined processing block length into data segments having the execution block length;

a first Round Key Addition circuit that adds said round key value to input data for each said execution block length;

an intermediate register/Shift Row transformation circuit that temporarily stores the output of said first Round Key Addition circuit and executes Shift Row transformation using said predetermined processing block length;

a Byte Sub transformation circuit wherein said intermediate register/Shift Row transformation circuit value is inputted for each said execution block length and Byte Sub transformation is executed;

a second Round Key Addition circuit wherein said intermediate register/Shift Row transformation circuit value is inputted for each said execution block length and said round key value is added for each said execution block length;

a Mix Column transformation circuit executing Mix Column transformation on the output of said second Round Key Addition circuit; and a second selector that outputs to said first Round Key Addition circuit one output from among the outputs of said first selector, intermediate register/Shift Row transformation circuit, Byte Sub transformation circuit, or Mix Column transformation circuit, the second selector enabling the first Round Key Addition circuit, the Byte Sub transformation circuit and the Mix Column transformation circuit to perform continuously at the execution block length without an extra processing circuit.

2. An encryption circuit according to claim 1 wherein said execution block length is a multiple of 8 bits.

3. An encryption circuit according to claim 1, wherein said processing block length is 128 bits and said execution block length is 32 bits.

4. An encryption circuit according to claim 1, wherein the key length of the cipher key is any of 128 bits, 192 bits or 256 bits.

5. An encryption circuit according to claim 1, wherein:
said Byte Sub transformation circuit comprises a matrix operation unit for decryption that executes a matrix operation on input data;
a third selector that outputs either the input data or the output of said matrix operation unit for decryption;
an inverse operation unit for executing an inverse operation on the data outputted from said third selector; a matrix operation unit for encryption that executes a matrix operation on the data outputted from said inverse operation unit; and a fourth selector that outputs either the output of said inverse operation unit or the output of said matrix operation unit for encryption.

6. An encryption circuit according to claim 5, wherein said matrix operation unit for decryption and said matrix operation unit for encryption comprises an XOR circuit so as to perform 8-bit operations at one clock cycle.

7. An encryption circuit according to claim 5, wherein said matrix operation unit for decryption and said matrix operation unit for encryption comprises an XOR circuit so as to perform 1-bit operations at one clock cycle.

8. An encryption circuit according to claim 1, wherein said Intermediate register/Shift Row transformation circuit can be used for both encryption and decryption through the reversal of order of input of shift data relating to amount of shift for date to be inputted into said intermediate register/ Shift Row transformation circuit, the input order for decryption being the reverse of the order for encryption.

9. An encryption circuit according to claim 1, wherein said Mix Column transformation circuit comprises a plurality of multiplication units with unique multipliers and an XOR circuit that performs XOR operations for said plurality of multiplication units, said Mix Column transformation circuit executing a matrix operation between data inputted into each multiplication unit and the multiplier established for each multiplication unit.

10. An encryption circuit according to claim 9, wherein said Mix Column transformation circuit comprises 4 operation units having 4 multiplication units capable of 8-bit unit operations and XOR circuits that execute XOR operations based on the outputs of said 4 multiplication units.

11. An encryption circuit according to claim 9, wherein said multiplication units can control 2 multipliers and are used for both encryption and decryption.

12. An encryption circuit according to claim 11, wherein said multiplication units are constituted to control addition values from high-order bits.

13. An encryption circuit according to claim 1 having a key expansion schedule circuit that generates from said cipher key, as an expanded key segmented into bit numbers corresponding to said execution block length, a plurality of round keys with bit numbers corresponding to a predetermined processing block length; the key expansion schedule circuit comprising:
a fifth selector that segments a cipher key into the number of bits corresponding to said execution block length and outputs the same;
a shift register to which flip-flop circuits are connected at a plurality of stages, said flip-flop circuits latching data in units of said execution block length;
a first XOR circuit that XORs the output of the final stage flip-flop circuit of said shift register with one constant selected from among a group of constants;
a sixth selector into which are inputted the outputs of those flip-flops of said shift register that are involved in operations for encryption and the outputs of those flip-flops involved in operations for decryption, and which selectively outputs one of these;
a Rot Byte processing circuit that rotates the output of said sixth selector;
a seventh selector into which the output of said sixth selector and the output of said Rot Byte circuit is inputted and which selectively outputs one of these;
a Sub Byte processing circuit that executes Byte Sub transformation an the output of said seventh selector for each said execution block length;
an eighth selector into which the output of said sixth selector and the output of said Sub Byte processing circuit are inputted, and which selectively outputs one of these;
a second XOR circuit that executes an XOR operation based an the output of said first XOR circuit and the output of said eighth selector; and
a shift register unit selector that selectively outputs, to those flip-flops of said shift register the outputs of which are subject to operations for encryption, either the output of said second XOR circuit or the output of the adjacent stage flip-flop.

14. An encryption circuit according to claim 13, wherein said shift register comprises 8 flip-flops executing data processing in 32-bit units, and said sixth selector is constituted so that the outputs of the second, fourth, sixth and eighth flip-flops from the bottom from among said flip-flops are inputted therein, and that it outputs one of these.

15. An encryption circuit according to claim 13, wherein through the input into said seventh selector of the output of said intermediate register/Shift Row transformation circuit and the input into said second selector of the output of said Sub Byte processing circuit, a single circuit can be used for said Sub Byte processing circuit and said Byte Sub transformation circuit of said round processing unit.

16. An encryption circuit for implementing in hardware AES, the encryption circuit comprising:
a key schedule unit that generates a plurality of round keys from a cipher key, each round key having a processing block length; and
a round function unit performing input data and round key encryption/decryption processing for each processing block length, the round function unit comprising:
a first selector that segments input data having processing block length into input data segments having execution block length which is smaller than said processing block length;
an XOR operation unit that XORs the input data and one of the round keys; and
a plurality of round processing units to iterate round processing that includes Byte Sub transformation, Shift Row transformation, Mix Column transformation and Round Key Addition, wherein each round processing unit comprises:
a first Round Key Addition circuit that adds said round key to input data segments having said execution block length;
an intermediate register/Shift Row transformation circuit that temporarily stores an output of said first Round Key Addition circuit and executes Shift Row transformation using said processing block length;
a Byte Sub transformation circuit wherein a segmented output of said intermediate register/Shift Row transformation circuit is input for each said execution block length and Byte Sub transformation is executed;
a second Round Key Addition circuit wherein the segmented output of said intermediate register/Shift Row transformation circuit is input for each said execution block length and said round key is added for each said execution block length;
a Mix Column transformation circuit executing Mix Column transformation on the output of said second Round Key Addition circuit; and
a second selector that outputs to said first Round Key Addition circuit one output from outputs of said first selector, intermediate register/Shift Row transformation circuit, Byte Sub transformation circuit, or Mix Column transformation circuit.

17. An encryption circuit according to claim 16, wherein said Byte Sub transformation circuit comprises:
a matrix operation unit for decryption that executes a matrix operation on input data;
a third selector that outputs either the input data or the output of said matrix operation unit for decryption;
an inverse operation unit for executing an inverse operation on the data outputted from said third selector;
a matrix operation unit for encryption that executes a matrix operation on the data outputted from said inverse operation unit; and
a fourth selector that outputs either the output of said Inverse operation unit or the output of said matrix operation unit for encryption.

18. An encryption circuit according to claim 15, the key schedule unit comprising:
a fifth selector that segments a cipher key into the number of bits corresponding to said execution block length and outputs the same;
a shift register to which flip-flop circuits are connected at a plurality of stages, said flip-flop circuits latching data in units of said execution block length;
a first XOR circuit that XORs the output of the final stage flip-flop circuit of said shift register with one constant selected from among a group of constants;
a sixth selector into which are inputted the outputs of those flip-flops of said shift register that are involved in operations for encryption and the outputs of those flip-flops involved in operations for decryption, and which selectively outputs one of these;
a Rot Byte processing circuit that rotates the output of said sixth selector;
a seventh selector into which the output of said sixth selector and the output of said Rot Byte circuit is inputted and which selectively outputs one of these;
a Sub Byte processing circuit that executes Byte Sub transformation on the output of said seventh selector for each said execution block length;
an eighth selector into which the output of said sixth selector and the output of said Sub Byte processing circuit are inputted, and which selectively outputs one of these;
a second XOR circuit that executes an XOR operation based on the output of said first XOR circuit and the output of said eighth selector; and
a shift register unit selector that selectively outputs, to those flip-flops of said shift register the outputs of which are subject to operations for encryption, either the output of said second XOR circuit or the output of the adjacent stage flip-flop.

19. An encryption circuit according to claim 18, wherein said shift register comprises 8 flip-flops executing data processing in 32-bit units, and said sixth selector is constituted so that the outputs of the second, fourth, sixth and eighth flip-flops from the bottom from among said flip-flops are inputted therein, and that it outputs one of these.

20. An encryption circuit according to claim 18, wherein through the input into said seventh selector of the output of said intermediate register/Shift Row transformation circuit end the input into said second selector of the output of said Sub Byte processing circuit, a single circuit can be used for said Sub Byte processing circuit and said Byte Sub transformation circuit of said round processing unit.

* * * * *

UNITED STATES PATENT AND TRADEMARK OFFICE
CERTIFICATE OF CORRECTION

| | | |
|---|---|---|
| PATENT NO. | : 7,158,638 B2 | |
| APPLICATION NO. | : 10/034321 | |
| DATED | : January 2, 2007 | |
| INVENTOR(S) | : Souichi Okada et al. | |

It is certified that error appears in the above-identified patent and that said Letters Patent is hereby corrected as shown below:

Column 27, Line 57, change "Intermediate" to --intermediate--.

Column 27, Line 60, change "date" to --data--.

Column 28, Line 42, change "an " to --on--.

Column 28, Line 49, change "an" to --on--.

Column 30, Line 2, change "Inverse" to --inverse--.

Column 30, Line 4, change "claim 15," to --claim 16,--.

Column 30, Line 49, change "end" to --and--.

Signed and Sealed this

Twenty-second Day of May, 2007

JON W. DUDAS
*Director of the United States Patent and Trademark Office*